(12) United States Patent
Johnson et al.

(10) Patent No.: US 7,468,802 B1
(45) Date of Patent: Dec. 23, 2008

(54) METHOD AND APPARATUS FOR PROCESSING PRINT JOBS VIA PARALLEL SPOOLING AND DESPOOLING OPERATIONS

(75) Inventors: Charles David Johnson, Boulder, CO (US); Russel Neil Miller, Boulder, CO (US); Larry David Teklits, Loveland, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/550,219

(22) Filed: Apr. 17, 2000

(51) Int. Cl.
*G06K 15/00* (2006.01)
*G06F 15/00* (2006.01)

(52) U.S. Cl. ..................... 358/1.15; 358/1.16

(58) Field of Classification Search .................. 358/1.1, 358/1.13, 1.14, 1.15, 1.16, 1.17, 1.18, 524; 358/403, 404; 710/7, 14, 15, 19, 20, 21, 710/52, 53, 61; 360/69, 75; 345/530, 533, 345/541; 365/189.011, 189.04, 189.14, 189.05
See application file for complete search history.

(56) References Cited

U.S. PATENT DOCUMENTS

| | | | | |
|---|---|---|---|---|
| 5,367,673 A | * | 11/1994 | Goldsmith et al. | 707/104.1 |
| 5,371,873 A | * | 12/1994 | Niwa | 710/20 |
| 5,478,155 A | | 12/1995 | Sasaki | |
| 5,546,511 A | * | 8/1996 | Kwak | 358/1.6 |
| 5,790,852 A | | 8/1998 | Salm | |
| 5,791,790 A | * | 8/1998 | Bender et al. | 400/61 |
| 5,930,467 A | | 7/1999 | Morita | |
| 6,023,343 A | | 2/2000 | Hoang et al. | |
| 6,081,883 A | * | 6/2000 | Popelka et al. | 712/28 |

FOREIGN PATENT DOCUMENTS

JP   8-123637   5/1996

* cited by examiner

*Primary Examiner*—Gabriel I Garcia
(74) *Attorney, Agent, or Firm*—Merchant & Gould

(57) ABSTRACT

A system and method for concurrently spooling and despooling print jobs, which allows print data associated with a print job to be despooled from storage at the same time that additional print data associated with the print job is spooled onto storage. Print jobs are received and storing of the print job is initiated. The portion of the print data that has been stored is concurrently read from the storage device, and sent to the print engine, thereby allowing the print job to be printed as the print job is being stored onto the storage device.

29 Claims, 13 Drawing Sheets

METHOD AND APPARATUS FOR PROCESSING PRINT JOBS VIA PARALLEL SPOOLING AND DESPOOLING OPERATIONS

BACKGROUND OF THE INVENTION

1. Field of the Invention

This invention relates in general to printing systems, and more particularly to a method and apparatus for concurrently spooling and despooling print jobs to increase print job throughput in printer spooling arrangements.

2. Description of Related Art

Desktop computers and computer networks are usually connected to various peripheral devices to extend the computer's capabilities. One common peripheral device is a printer, which produces text and images in hardcopy format. There are many different types of printers, broadly grouped into impact printers and non-impact printers. Printers may also be categorized by the environment under which they operate, such as local and network printers. A local printer is one that is directly connected to one of the ports on a desktop, workstation, or other single host computer, and a network printer is shared by multiple computers over a network.

Local printers receive print data from a source, such as a single host computer, and network printers receive print data via a network that contains at least one host computer or network server. In typical desktop personal computer (PC) environments, "print jobs" are submitted (via the direct connection or network) to the printer, as a means to pass the print data to the printer. Print jobs represent units of work to be run on a printer, and can include printing one or multiple files, depending on how the print jobs are requested. In single host environments, and particularly in network environments, a connected printer may be presented with a large print file or multiple print files by way of the print jobs. Generally, the printer is equipped with sufficient memory to accept large or multiple print jobs, thereby freeing the computer to continue normal operations by allowing the printer to retain the print jobs until they are physically printed. Alternatively, print spooling may be employed to control the flow of print data to the printer, and generally stores the programs in an organized manner on a hard disk until the printer becomes available.

More particularly, to "spool" (Simultaneous Peripheral Operation On Line) is to utilize a program or device that controls the flow of data to an outputting device such as a printer. Spooling means that a user can send data to a printer that is already occupied, and the data will be passed onto the printer when it becomes available.

However, despite the ability of a printer to spool a large file, or to spool multiple files, a printer can only print one job at a time. In prior art systems, this bottleneck is exacerbated by the fact that the complete incoming print job is received on the hard disk before the print job is sent to the print engine for printing. Therefore, particularly in the case of large print jobs, a significant delay is introduced in printing the job(s), which adversely affects overall printer throughput.

Printing of graphical images and other data-intensive files has increased, particularly due to evolving technologies and the increased accessibility of available information, such as via the Internet. In view of the potentially increasing print job size, and in view of the ever-increasing use of "shared" printers via networks, printer throughput is a major concern. It would be desirable to avoid the aforementioned printer throughput problems, particularly the problem of having printing idle times while a print job is spooling, and other problems associated with prior art printing systems. A need exists in the printing industry for a system and manner of expediting spooling and despooling processes, to increase the overall printer throughput. The present invention provides a solution to the aforementioned and other shortcomings of prior art printing systems, while offering additional advantages over the prior art.

SUMMARY OF THE INVENTION

To overcome limitations in the prior art described above, and to overcome other limitations that will become apparent upon reading and understanding the present specification, the present invention discloses a system, apparatus and method for concurrently spooling and despooling print jobs sent from one or more client systems. The present invention allows print data associated with a print job to be read from or "despooled" from storage at the same time that additional bits or bytes of the print data is spooled onto storage. In this manner, print job throughput in printer spooling arrangements is increased.

In accordance with one embodiment of the invention, a method is provided for increasing print job throughput in printer spooling arrangements. A print job having associated print data is received and written to a storage device. The portion of the print data that has been stored is concurrently read from the storage device, and is sent to the print engine, thereby allowing the print job to be printed as the print job is being stored onto the storage device. In one particularly useful embodiment of the invention, the method is effected by modules embedded within the printer performing the printing function.

In accordance with another embodiment, a printing device is provided for processing print job requests, where the print job requests are received at the printing device via at least one input channel. A storage medium, such as a hard disk, is provided to temporarily store print data associated with the print job requests. A spooling module is coupled to receive the print job requests and associated print data, and to write the print data to the storage medium. A despooling module receives notification of the presence of print data on the storage medium, and concurrently reads a first portion of the print data from the storage medium as a second portion of the print data is being written to the storage medium. A print engine prints the print data read from the storage medium.

A print server system is also provided, for processing print jobs generated by client systems arranged in a network. The print jobs include associated print data in which a printed output is desired. Transmission media is provided to transfer the print jobs initiated on the network to a printing device that receives and processes the print jobs. The printing device includes a storage medium to store the print data, and a spooling module to write the print data to the storage medium. A despooling module receive notification of the presence of the print data as it is being stored on the storage medium, and concurrently reads a first portion of the print data from the storage medium as a second portion of the print data is written to the storage medium. The print data read from the storage medium as it is concurrently being written to is directed to a print engine to produce the desired printed output.

In accordance with another aspect of the invention, a computer-readable program storage medium tangibly embodying a program of instructions executable by a printer system to process print jobs is provided to perform a series of operations. These operations include receiving a print job having associated print data, and writing the print data to a storage device. The print data is read from the storage device concurrently as the print data is written to the storage device, and this retrieved print data is then sent to a print engine for printing.

In accordance with another embodiment of the invention, a method for concurrently spooling and despooling a print job to and from a storage device is provided. The method includes creating a file on the storage device to which the print data associated with that print job can be stored. The print data is then written to the storage device. A status indicator indicating whether the print data is currently being written to the storage device is maintained, and is monitored by a despooling task to determine if the print job is currently being written to the storage medium. The print data associated with the print job is retrieved from the storage medium concurrently as the print data is written to the storage medium, where the print data retrieved is that portion of the print data that has already been written to the storage device. The retrieved print data is then sent to the printing device for printing.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

FIG. 5, including

FIG. 8, including

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides a manner of concurrently spooling and despooling print jobs, and thereby increasing print job throughput in printer spooling arrangements. Print jobs having associated print data to be received from a print job requester, such as a client computer system, and to write or "spool" the print data to a storage medium such as a hard drive. The present invention allows the print data to be read from or "despooled" from storage at the same time that additional bits or bytes of the print data continues to be spooled. In one particularly advantageous embodiment of the invention, the hard drive or other storage resides on the printing device itself, so that the invention is operative as an embedded function within a printer.

Figure 1:
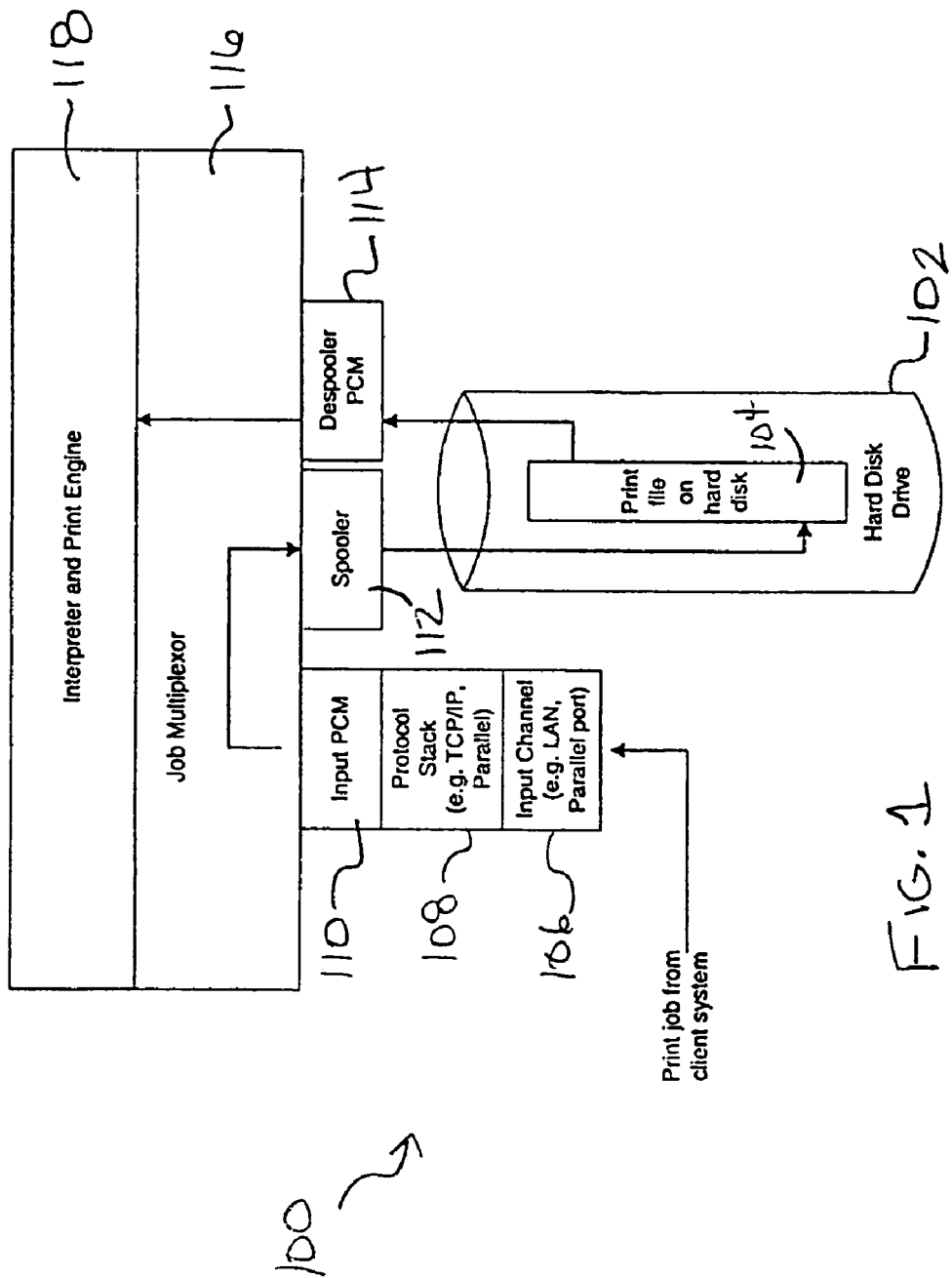
FIG. 1 is a block diagram illustrating a portion of a printing device incorporating the principals of the present invention.

FIG. 1 is a block diagram illustrating a portion of a printing device 100 incorporating the principals of the present invention. A storage medium, such as hard disk 102, is provided in connection with the printer 100. The hard disk 102 may be used as a spooling device, as well as for other functions. A spool (Simultaneous Peripheral Operation On Line) module generally represents a program or device that controls the flow of data to an outputting device such as a printer. Spooling allows a user to send a print job as a file 104 to the hard drive where it is essentially queued for printing by the printer 100. A print job is a unit of work to be run on a printer, and can include printing one or more files, depending on how the print job is requested. The system assigns a unique job number to each job it runs. In prior implementations, the entire incoming print job is received on the hard disk before that job is sent to the print engine for printing. Once the print job is received in its entirety, the print data can be passed onto the print engine. This introduces a delay in printing the job, and large jobs are delayed more than small ones. The present invention minimizes such delay, thereby increasing printing efficiencies and improving overall printer throughput.

The printing device 100 receives a print job from a client system via an input channel 106. The input channel represents any printer input configuration, such as a local area network (LAN) port, parallel port, etc. The protocol stack 108 represents the module or operation for passing the print job from the physical layer to the appropriate protocol layer depending on the particular physical layer and protocol (e.g., TCP/IP, parallel, etc.).

The present invention provides a manner of processing the print job such that print job spooling and despooling is performed concurrently. In this manner, the hard disk embedded within or otherwise associated with the printer can concurrently store and distribute print job data to reduce data transfer latencies associated with traditional spooling processes. In one embodiment of the invention, multiple tasks are implemented to accomplish this concurrent spooling functionality, and in a more specific embodiment, two primary tasks are implemented. However, as will be recognized by those skilled in the art from analysis of the operational description and associated drawings herein, the operational features of the present invention could be combined into a single task or distributed among a greater number of more specialized tasks.

In one embodiment, a first task, referred to herein as the input printer control module (PCM) task, is represented by the input PCM task module 110. The input PCM task 110 receives data from an input source and invokes spooler routines, represented by spooler module 112, that write the data to the hard disk 102. A second task, referred to herein as the despooler PCM task, is represented by the despooler PCM task module 114. The despooler PCM task 114 invokes despooler routines that read data from the hard disk 102 and pass the data through the multiplexer module 116 to the interpreter and print engine 118 where the data can be printed. In the illustrated embodiment, the spooler module 112 represents both the spooling and despooling operations. The present invention facilitates concurrent spooling and despooling of one or more print jobs to/from the hard disk 102, and manages the process such that the data read function does not get ahead of the writing function.

Figure 2:
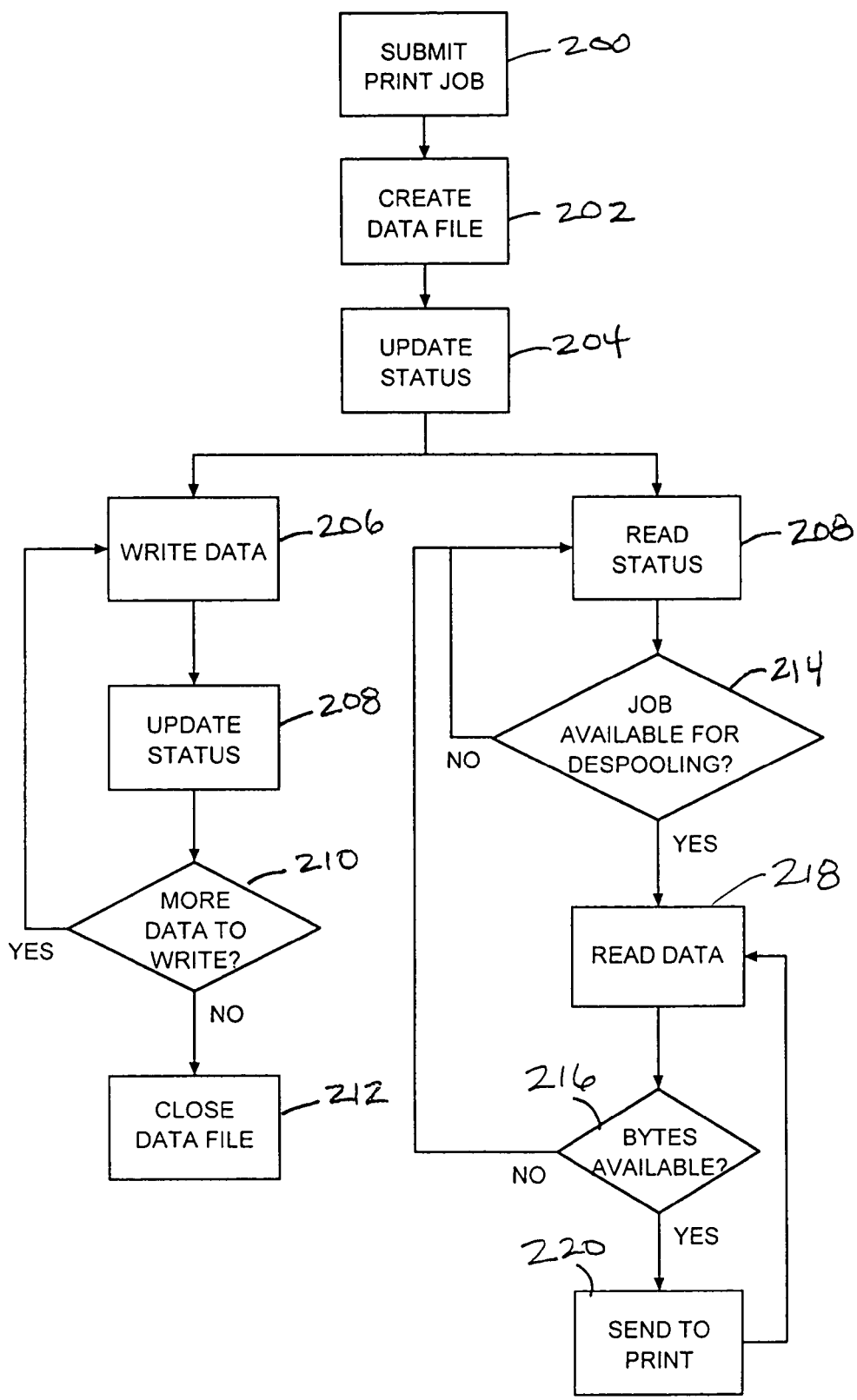
FIG. 2 is a flow diagram illustrating a process of increasing printer throughput efficiency by performing concurrent spooling and despooling operations in accordance with one embodiment of the invention.

FIG. 2 is a flow diagram illustrating a process of increasing printer throughput efficiency by performing concurrent spooling and despooling operations in accordance with one embodiment of the invention. A user submits 200 a print job to the printer, which is received via an input channel such as input channel 106 of FIG. 1. This invokes the input PCM task that carries out various functions to initiate spooling functions. One such function is to create a data file as seen at operation 202. This opens a data file on the spooling disk with a file name or "file handle" assigned to the data file. Status is updated 204 to store information related to the print job, including storing the job ID for the print job being spooled so that the despooler PCM task can determine if, and which, print jobs are currently being spooled. Other status can be maintained as well, such as the file type, and other status information.

A call is made to the spooler to write the data to the data file on the disk. This is illustrated at operation 206. As depicted in FIG. 2, a concurrent operation 208 is performed, which is for the despooling module to read the status to obtain the handle(s) for a print job that is currently spooling. This illustrates that despooling capabilities may be performed concurrently with the spooling of print files, if that particular print job exhibits status that identifies it as one capable of being despooled while it is being spooled. For example, certain file types may be unavailable for despooling as it is being spooled, and the status information will identify whether the particular print job is a candidate to exploit this functionality.

As indicated above, the data will be written 206 to the data file opened on the disk for the particular print job. Certain status information may again be updated 208, such as changing the status of the print job to indicate that it is currently spooling. This status information can be used by the despooler and/or despooling PCM, and includes the number of bytes currently written to the data file. This information can be used by the despooler PCM to determine how much data can currently be despooled to the multiplexer for printing.

The data is written to the data file until all of the data has been written, as determined at decision operation 210. Multiple write calls may be used to write the data to the specified data file. Data will be written as long as there is more data to write. When all of the data has been written for the particular print job, the data file is closed 212, and status may be further updated.

As the spooling occurs, despooling may occur. The status is read 208 or alternatively sent to the despooling module. If no print jobs are waiting to be despooled as determined at decision operation 214, no despooling will occur until such print job(s) become available. When one or more print jobs are available for despooling, data from the data file above the number of bytes available may be read 218, and ultimately sent to print as seen at operation 220. It is determined whether bytes are available for despooling at decision operation 216. Despooling of data associated with a print job cannot exceed the number of bytes actually written to the data file, and decision operation 216 represents a determination of whether the number of bytes currently written to the data file exceeds the number of bytes currently despooled. Therefore, data is read 218 as long as a predetermined number of bytes, for example any bytes, are found to be available as determined at decision block 216, e.g., by viewing the status of the print job. Where bytes are not found to be available, printing will be suspended until it is again determined 216 that bytes have become available for despooling. When this occurs, printing of the print data will resume, as seen at operation 220. In one embodiment, the data is sent to the multiplexer component, which in turn sends the data to be printed to the print engine.

Figure 3:
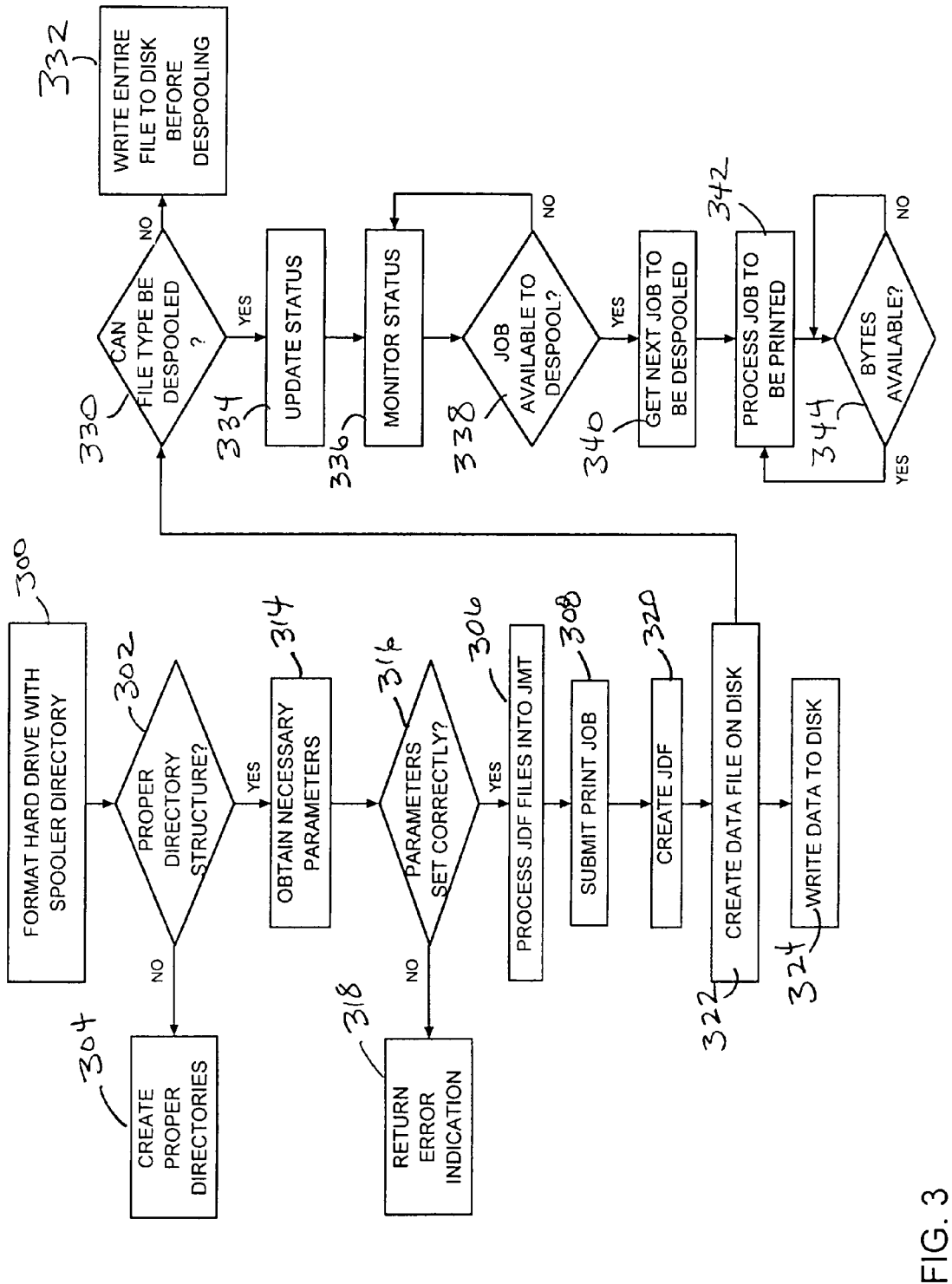
FIG. 3 is a flow diagram illustrating another embodiment of a more detailed process of increasing printer throughput efficiency by performing concurrent spooling and despooling operations in accordance with the invention.

FIG. 3 is a flow diagram illustrating another embodiment of a more detailed process of increasing printer throughput efficiency by performing concurrent spooling and despooling operations in accordance with the invention. An initialization process, upon boot up of the printer, ensures that the disk device used for spooling print jobs is properly formatted and that the proper directory structure exists, as seen at operation 300. If, upon initiation of a spooling process, it is determined 302 that the proper directory structure exists, it will be created 304. In one embodiment, this is determined by recognizing that no print or job description file (JDF) directory exists under the spooler directory. JDFs are discussed more fully below.

If it is determined 302 that the proper directory structure exists, necessary configuration parameters are obtained 314, and in one embodiment these parameters are obtained through a call to a configuration manager. These parameters include whether spooling is enabled, whether despooling is enabled, the maximum number of spooling jobs that can be maintained and are currently in the spool component, how many open file descriptors can be maintained and are currently in the spool component, and the like. If the parameter values do not meet predefined criteria as determined at decision operation 316, an error or other information indication is returned as illustrated at operation 318. Otherwise, the JDF files are processed into the job monitor table (JMT) as shown at operation 306. Generally, the job monitor stores information about all the spooled, currently spooling and currently despooling jobs for the spooler component. Print jobs can then be submitted 308 to the printer, and a JDF is created 320 for the particular print job being processed. Generally, the JDF file is used to resurrect the job monitor table in the event of some power cycle to the printer.

The print job being processes has print data associated with it, which contains the content which is to ultimately be printed. A data file for this print job is created 322 in a print directory for subsequent "write to disk" functions. The data can then be written to the created data file on the storage medium, as shown at operation 324.

Once the data file is created, it is determined 330 whether the print jobs are of a file type available for despooling. If not, an indication is returned to identify the particular print job as one that cannot be despooled during the spooling process, and the file will be spooled to disk in its entirety before despooling takes place as shown at operation 332. If the print jobs are available for despooling, the status of the print job is updated 334 to reflect its availability to be despooled while it is spooled. This status is monitored 336, and when the despooling PCM task is notified that the print job is available to be despooled as determined at decision operation 338, the next job to be despooled is obtained 340, and the job is processed to the multiplexer component to be printed as depicted at operation 342. As long as a predefined number of bytes have been spooled and are thus available for despooling as determined at decision operation 344, the print data is read from the disk, and printed.

As can be seen from FIG. 3, the despooling process can be effected as the data is being spooled. In other words, as the data is written to the storage medium as shown at operation 324, the despooling modules determine whether a print job is spooling and is available for despooling, and if so, that print job is despooled for printing as illustrated at operation 342. Thus, print processing of a print job that is directed to storage is initiated as soon as any data exists on the hard disk for the job. In this manner, the receipt of a print job from a client system and writing the received data to the hard disk proceeds simultaneously and in parallel with the processing and printing of the job by reading the received data from the storage. Reading the file from storage is managed such that reading continues as long as print job data is available on the storage medium. Reading the file from storage is suspended when all of the received data on the storage medium has been read but the end of the file has not yet been reached, and is resumed when more data is available on the storage medium. Print jobs are printed faster, which improves overall printer throughput.

Figure 4:
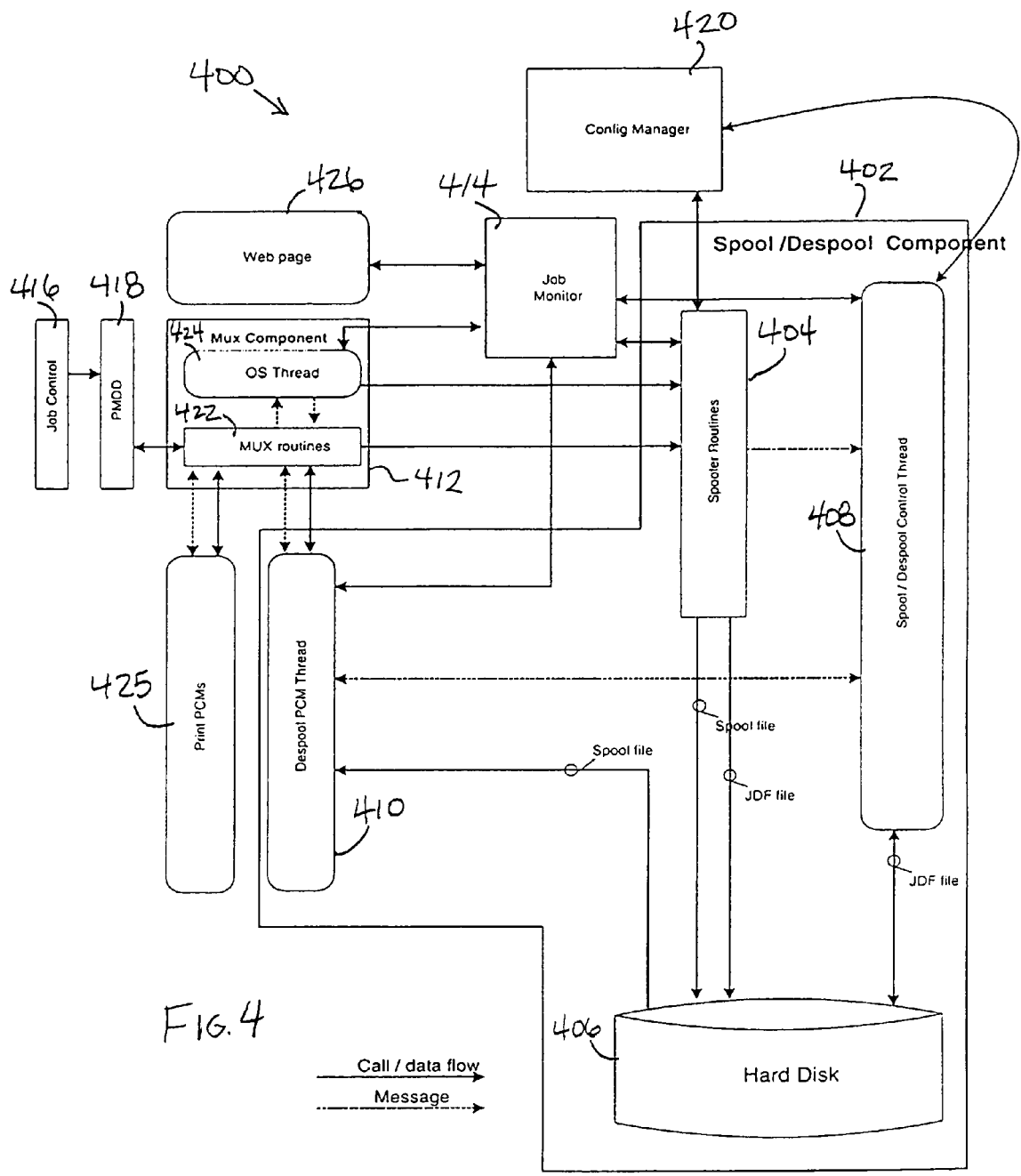
FIG. 4 is a block diagram of a printing apparatus implementing the aspects of the present invention.

FIG. 4 is a block diagram of a printing apparatus 400 in accordance with one embodiment of the present invention. The spool/despool module 402 represents various operational modules associated with spooling and despooling print jobs. It should be noted that the logical operations of the various embodiments of the invention described herein may be implemented in a variety of manners, including a sequence of computer implemented steps running on a computing system, and/or interconnected machine modules within the computing system. The particular implementation used is a matter of choice dependent on the performance requirements of the printing device or print server.

Within the spool/despool module 402, a spooler module 404 represents various spooler operations, such as spooler programming routines, that carry out operations to properly spool print jobs to the hard disk 406. The spool/despool control thread 408 processes all activities coming in from the spooler module 404. The spool/despool control thread 408 processes attribute changes from the spooler module to notify the despooler PCM thread 410 of activities concerning the job that the despooler PCM 410 is currently processing to the multiplexer (MUX) component 412. The despooler 408 processes all of the JDF files into the job monitor table of the job monitor module 414, which describes elements about the print job such as the job ID, PCM ID that the job came in on, whether the file is a particular file type, and others described more fully below. The despooler ensures that spooled print jobs are preserved in the system after any kind of power cycle that might occur to the printer. The despooler 408 also initiates the despooler PCM 410 processes.

A newly arriving job is forwarded by the receiving print channel to the MUX component 412. The MUX 412 manages logical connections between data channels (which represent data sources) and the job control module 416 and spooler output paths (which represent data sinks). The PMDD 418 represents the printer memory device driver. The MUX 412 has several choices for the disposition of a new job. It may direct incoming print data to the printer for immediate printing, or to the spooler. It may also signal the data channel to suspend the receipt of additional data until it can be processed. The connection between a data source and data sink is managed such that no more than one data channel has access to the printer at a time. When used in connection with the spooling feature, the MUX 412 manages the logical connection from data channels to the spooler, and one or more spooling connections may be active at the same time. The maximum number of spooling connections that may be active at a time is a system configuration parameter maintained by the configuration manager 420. The configuration manager 420 maintains various other configuration parameters. For example, as described more fully below, the configuration manager 420 receives calls from the spooler 404 to obtain parameters as described at operation 314 of FIG. 3.

Each PCM consists of one or more tasks. The uppermost layer of a PCM makes calls to functions within the MUX component, depicted by the MUX routines 422. The MUX component contains a separate thread, called the Output Selection (OS) thread 424. This thread makes decisions that connect a data channel to an output path—an output selection decision. The OS thread is signaled to make a selection decision at various times, including at job arrival and at job completion. When the first block of data for a new job is processed by a PCM, the OS thread 424 is signaled to make an output path decision. The OS thread is also signaled to select the next data channel to be processed when end-of-job is reached on an active output path (the printer output path or a spooled job). The output selection thread will call the job monitor 414 to request the next job to go to the printer or spooler. The print PCMs 425 manage the printing process itself.

A master output selection control attribute determines how the MUX output selection thread 424 is to handle an incoming job. It is fetched from configuration manager 420 whenever it is examined. This attribute is valid where a spooler is implemented in the system, and when the spooler is enabled to accept new jobs and the despooler is enabled to print spooled jobs. This master control attribute is examined by the OS thread 424 if this set of conditions is true. If these conditions are not true, then the master output selection bit is not examined, and the output path available for incoming jobs is the printer. In such a case, any received job that must be spooled is rejected. The master output selection attribute has various values, which can be set through a SNMP, a console, or a web page 426. If the aforementioned set of conditions for spooling are not met, then the selection does not appear on the web page or the console.

As previously indicated, the spooler is the front end process to the despooler process. Upon initialization of the printer, the hard disk is formatted with a "spooler" directory. In this manner, a certain amount of disk space is allocated for the spooler directory. In one embodiment, initialization is performed upon power up or "boot up" of the printer. Alternatively, initialization may be performed via express designation of an initialization command or other specific action.

Generally, one operation of the spooler process is to manage incoming print job requests. The spooler manages various operations, including the spooling of new print jobs, altering print jobs that are already spooled, and altering print job priorities for print jobs that are already spooled. The spooler also makes status changes to print jobs in a job monitor table. The spooler notifies the despooler when new jobs enter the spool component and the despooler PCM is not currently processing a job to the MUX. The spooler notifies the despooler when a job in the spool component is altered and is currently being processed by the despooler PCM to the MUX.

More particularly, the spooler component effects function calls that the MUX component, and other entities of the controller, use to send new print jobs. These additions and other status updates to these print jobs are maintained in various status modules, including the job monitor table and the job description file (JDF). The job monitor module previously described includes a job monitor table to store information relating to all of the spooled, currently spooling, and currently despooling print jobs for the spooler component. The information about each of these spooled, currently spooling and currently despooling print jobs is also stored in the JDF for persistence purposes over printer power cycles.

The JDF is a job description file that includes data relating to the specific print job. The job monitor table includes fields corresponding to fields in the JDF, and the JDF is used to resurrect the job monitor table in the event of a power cycle or other power loss to the printer. In this manner, jobs in the print queue will be preserved over power cycles of the printer, provided the request to spool new jobs completed spooling before the occurrence of the power cycle of the printer. The despooler, upon initialization of the printer, reads each of the JDF files and informs the job monitor to create an entry in the job monitor table for these print jobs. When a new job is sent to the spooler, a new JDF will be created and written into the JDF directory. In one embodiment, the fields of the JDF and job monitor table are corresponding fields, and reference to the JDF and job monitor table may be used interchangeably for purposes of this description.

An example of the contents of such a JDF file is shown in Table 1 below:

TABLE 1

| | |
|---|---|
| jobid | The job ID of the spooled job |
| jobstatus | Denotes if the data file in the print directory was 0 (being written to disk), 1 (successfully written to disk), or 2 (unsuccessfully written to disk) |
| bytesspooled | Denotes the total number of bytes that have been spooled to the data file for this job in the print directory |
| commandflag | Denotes whether to 0 (print), 1 (hold), 2 (print and hold this job), or 3 (cancel) |
| spoolpriority | Denotes the order for which this job to be printed |
| copies | Denotes the number of copies the despooler PCM will produce to the MUX |
| format | Denotes whether to 0 (not format), 1 (format PDF to PS this file through the despooler PCM) |
| pcmid | Denotes the ID of the PCM that this job came in on |
| pcmpriority | Denotes priority of the PCM that this job came in on |
| pcmpersonality | The personality of the PCM that the job came in from |
| userhost | Denotes the user and/or host that sent this job to the printer |
| title | Denotes the title of this job to be printed |

Referring to Table 1, the "jobid" field is used to identify the job identification value, or job ID, of the spooled print job. The "jobstatus" field identifies whether the data file in the print directory is currently being written to disk, has already been successfully written to disk, or was unsuccessful in being written to disk. The "bytesspooled" field stores the quantity of data, such as the total number of bytes, that have been spooled to the data file in the print directory for the particular job. The "commandflag" denotes whether to print, hold, print and hold, or cancel the print job.

The "spoolpriority" field identifies the order in which this job will be printed relative to other print jobs. In one embodiment of the invention, valid priority values are 1-1000, with 500 being the default priority value. The spool priority essentially allows the print job to be moved in the print queue relative to other print jobs. Thus, if the spool priority is changed, the print job will be moved to that specific order number in the print queue. For example, if the queue is queuing 20 print jobs, and the user wants print job having a priority of 10 to be processed next by the despooler PCM, the user makes a call to alter the spool priority from 10 to 1 in the queue.

The "copies" field holds the number of copies the despooler PCM will produce to the multiplexer. The "format" field indicates whether or not to format PDF to pass this file through the despooler PCM. The "pcmid" field denotes the identification value, or ID, of the PCM that this job came in on. The "pcmpriority" field records the priority of the PCM that this job came in on, and in one embodiment of the invention, valid PCM priority values range from 1 to 9 with 5 being the default value.

A "pcmpersonality" field is provided, which identifies the personality of the PCM that the job came in on. The "userhost" field identifies the user and/or host that sent this job to the printer, and the "title" field identifies the title of the job to be printed.

As previously indicated, the job monitor table includes fields common to the JDF file. In one embodiment of the invention, the structure used by the spooler function to pass data into the spooler/despooler processes is configured using software.

FIG. 5 is a flow diagram illustrating one embodiment of a spooler process in accordance with the present invention. FIG. 5 illustrates the general processing by the spooler process when a new job arrives. When a new job is sent to the spooler, a call is made to see if this job can be spooled currently (hereinafter referred to as sp_open function). The function sp_open with the new job structure (p) as the parameter returns a file handle for subsequent spooler write calls (i.e., sp_write) if the job can be spooled, or a failure (a negative value) if the job cannot be spooled. The new job structure (p) is described below.

The function sp_open issues a call into the configuration manager (i.e., configuration manager 420 of FIG. 4) to get the values for a plurality of parameters, and in one embodiment these parameters include a spooling parameter (SP_SPOOL), a despooling parameter (SP_DESPOOL), and various other configurable parameters such as SP_MAXJOBS and SP_MAXFILESOPEN. The value of SP_SPOOL can be ENABLED or DISABLED, and the value for SP_DESPOOL can be ENABLED or DISABLED. The value of SP_MAXJOBS is a configurable number that informs the spooler how many jobs can be contained within the spool component. In one embodiment, the default maximum print jobs that can be contained within the spool component is 1000. The value of SP_SPOOLEDJOBS will be set to the number of print jobs currently in the spool component. The value of SP_MAXFILESOPEN is a configurable value that informs the spooler how many open file descriptors can be contained within the spool component, and in one embodiment the default value is 4. The value of SP_SPOOLFILES is set to the number of open file descriptors currently in the spool component.

Figure 5A:
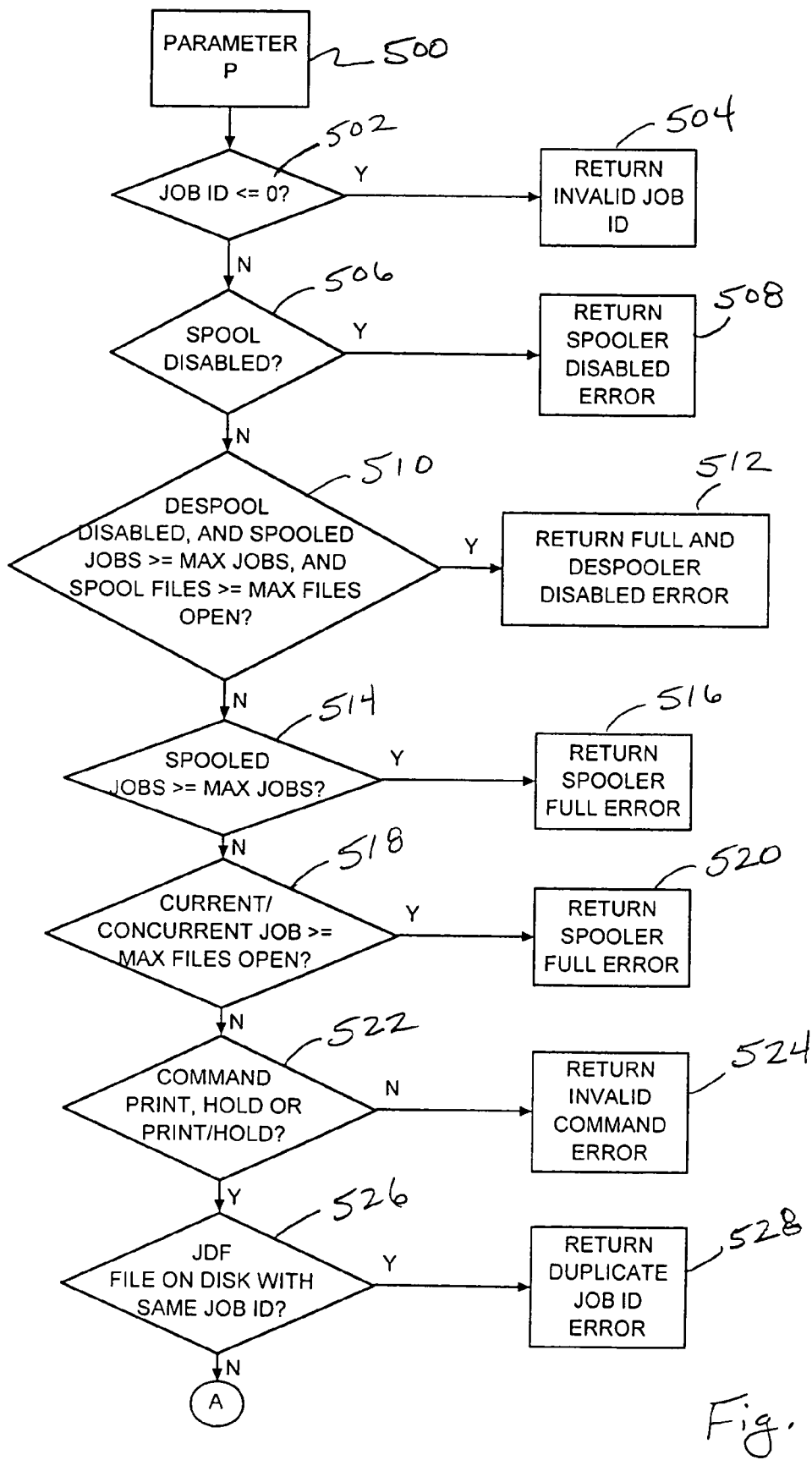
FIGS. 5A, 5B and 5C, is a flow diagram illustrating one embodiment of spooling a new print job in accordance with the present invention.
Figure 5B:
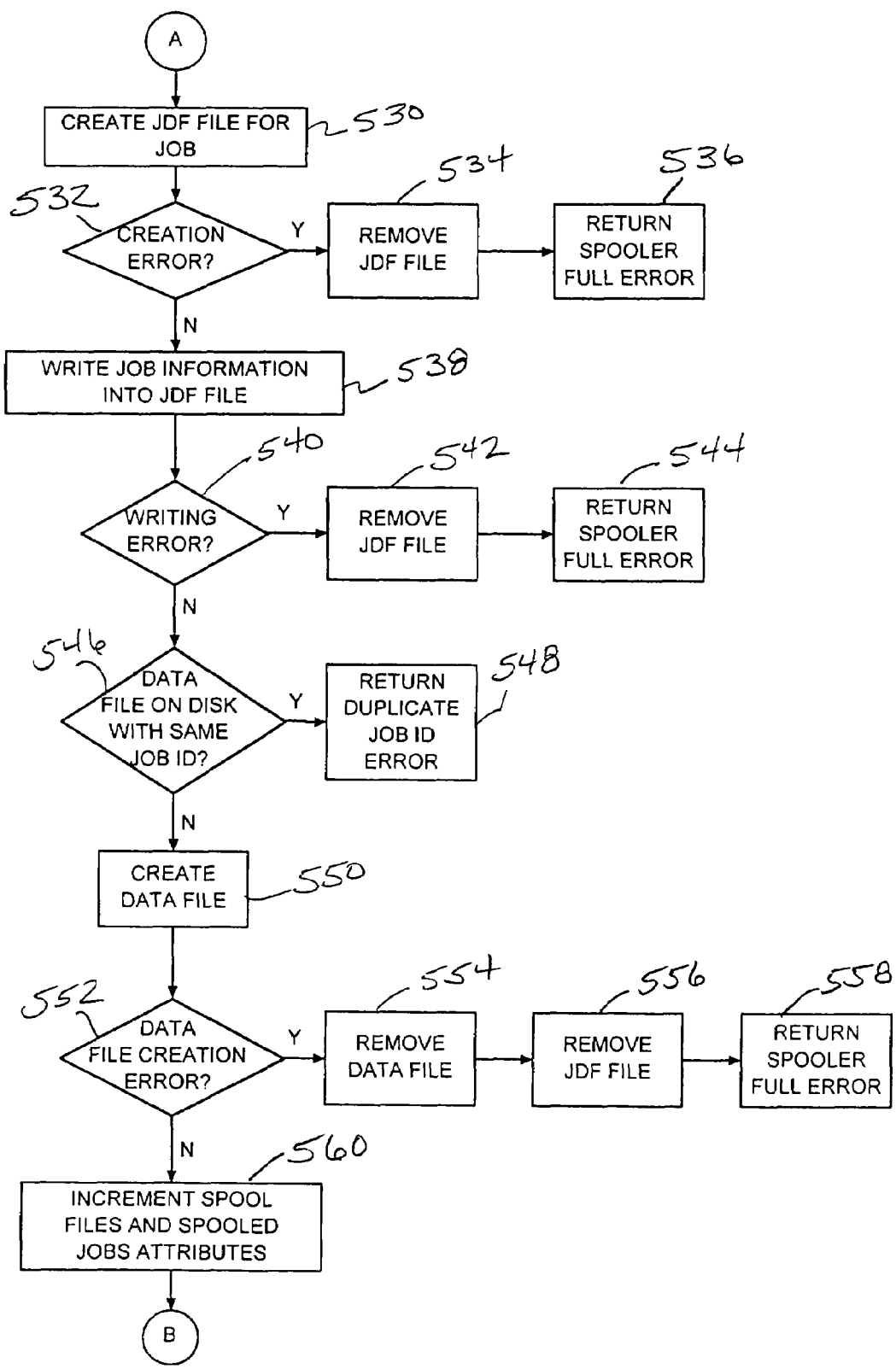
Figure 5C:
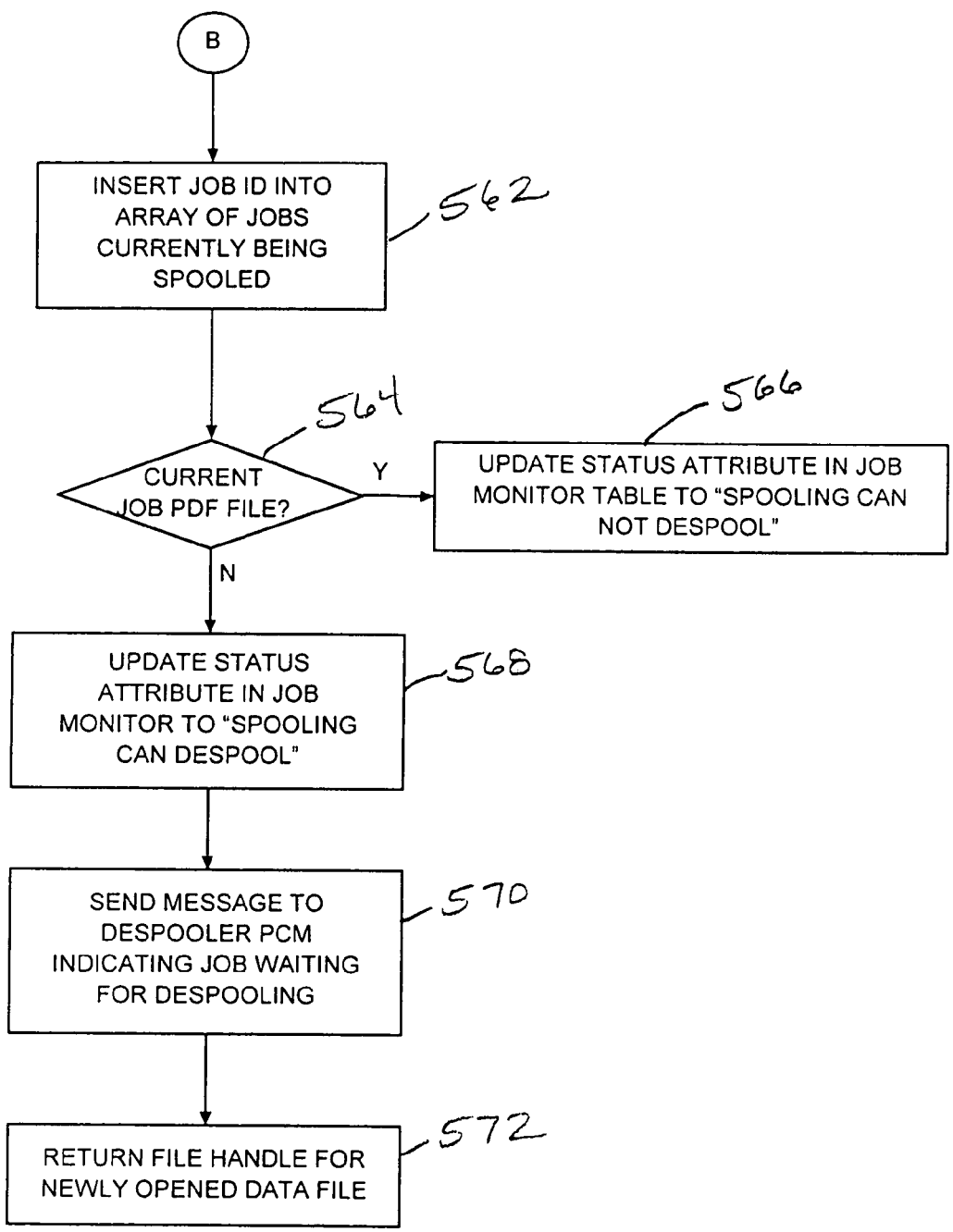

Referring now to FIG. 5, including FIGS. 5A, 5B and 5C, a flow diagram is provided illustrating one embodiment of a manner of spooling a new print job in accordance with the present invention. In the following description, the logical operations of the various embodiments of the invention described herein may be implemented in a variety of manners, including a sequence of computer-implemented steps running on a computing device within the printing system, and/or interconnected machine modules within the printing system. The particular implementation used is a matter of choice dependent on the performance requirements of the printing system. While other implementations including hardware implementations are feasible, one embodiment of the invention utilizes a software implementation in connection with computing hardware to carry out designated operations of the invention. Generally, the programs executed by the computing portion of these printing systems include routines, programs, objects, components, data structures, etc. that implement particular abstract data types and perform particular tasks or operations.

The operations described in connection with FIG. 5 are invoked by a user who sends a new print job to the printer. The parameter p 500 represents the new print job structure for the function. It is determined whether the job ID is within a predetermined value range, such as less than or equal to zero, as depicted at decision operation 502. If so, an invalid job ID indication is returned 504. Otherwise, it is determined whether the spooler is disabled at decision operation 506, which returns 508 a spooler disabled error if the spooler is disabled. Where the spooler is disabled, the spooler will not accept any new print jobs. If the spooler is not disabled, other conditions are checked. As indicated at decision operation 510, it is determined whether the despooler is disabled, whether the number of spooled print jobs is greater than or equal to a predetermined maximum number of print jobs (e.g., SP_MAXJOBS), and whether the number of open file descriptors is greater than or equal to a predetermined maximum number of open file descriptors (e.g., SP_MAXFILESOPEN). If all of these conditions are met, a full/despooler disabled error is returned 512. Otherwise, it is individually determined 514 whether the total number of print jobs that are spooled is greater than or equal to the configurable maximum spooled jobs value (e.g., SP_MAXJOBS), and if so, a spooler full error is returned 516. One embodiment of a process for implementing such operations is provided in the following example.

EXAMPLE #1

If the jobid is less than or equal to zero
    Return SP_INVALIDJOBID
If SP_SPOOL is DISABLED:
    Return SP_SPOOLERDISABLED error.
If SP_DESPOOL is DISABLED and SP_SPOOLEDJOBS is greater than or equal to SP_MAX JOBS and SP_SPOOLFILES is greater than or equal to SP_MAXFILESOPEN:
    Return SP_FULLANDDESPOOLERDISABLED error.
If SP SPOOLED JOBS is greater than or equal to SP_MAXJOBS:
    Return SP_SPOOLERFULL error.

It is also individually determined 518 whether the total number of new concurrent print jobs (open file descriptors, SP_SPOOLFILES) is greater than or equal to the configurable maximum number of open file descriptors (e.g., SP_MAXFILESOPEN), and if so, a spooler full error is returned 520. The print command in the new job structure is also checked for validity at decision operation 522, where it is determined whether the command is a print, hold or print/hold command. If not, an invalid command error is returned 524.

The spooler function will also create and write a JDF file into the JDF directory. As previously indicated, the JDF file is a job description file that includes relevant data about the particular print job. The JDF file is used to resurrect the job monitor table in the event of a power cycle to the printer. The despooler, upon boot up of the printer, reads each of these JDF files and informs the job monitor to create an entry in the job monitor table for the particular print job. In the flowchart of FIG. 5, various operations are performed to carry out the creation and writing of the JDF file to the JDF directory. It is first determined at operation 526 whether a JDF file already exists on the disk with this job ID. If so, a duplicate job ID error is returned 528. Otherwise, the JDF file is created 530 for the job. If an error occurs while creating the JDF file for this job as determined at decision operation 532, the JDF file is removed 534 and a spooler full error is returned 536. If no error occurs, the information relevant to this print job is written into the JDF file as seen at operation 538. If an error occurs while writing to the JDF file for this job as determined at decision operation 540, the JDF file is removed 542 and a spooler full error is returned 544. One embodiment of a process for implementing operations such as those described in connection with operations 518-544 is provided in the following example.

EXAMPLE #2

If CURRENTCONCURRENTJOB is greater than or equal to SP_MAXFILESOPEN:
    Return SP_SPOOLERFULL error.
If command in new job structure (p) is not PRINT (0), HOLD (1), or PRINTHOLD (2):
    Return SP_INVALIDCOMMAND error.
If a JDF file exists on the disk with this same jobid
    Return SP_DUPLICATEJOBID error.
Create a JDF file for this job in the/spooler/jdf directory.
If error occurs while creating the JDF file for this job:
    Remove the JDF file.
    Return SP_SPOOLERFULL error.
Write the necessary contents about this job into the JDF file.
If error occurs while writing to the JDF file for this job:
    Remove the JDF file.
    Return SP_SPOOLERFULL error.

If the JDF file is created and written properly, it is determined 546 whether a data file exists on the storage medium that has the same job ID. If so, a duplicate job ID error is returned 548. If not, a data file for this print job is created 550 in the print directory for subsequent write calls (e.g., sp_write). In one particular embodiment, the data file is created in the print directory, and its filename is assigned as its job ID in decimal ASCII format. If a data file creation error occurs during the creation of the data file as determined at decision operation 552, the data file is removed 554, the JDF file is removed 556 and a spooler full error is returned 558.

If successful in creating the files for this print job, a status attribute for this print job entry in the job monitor table is updated. In one embodiment, this involves incrementing the number of open file descriptors currently in the spool component (e.g., SP_SPOOLFILES) and incrementing the number of print jobs currently in the spool component (e.g., SP_SPOOLEDJOBS), as seen at operation 560. The job ID of the job being spooled is inserted 562 into an array of jobs currently being spooled. In one embodiment, the array size is the number of jobs that can be spooled plus one. One embodiment of a process for implementing operations such as those described in connection with operations 546-562 is provided in the following example.

EXAMPLE #3

If a data file exists on the disk with this same jobid
    Return SP_DUPLICATEJOBID error.
Create the data file with the jobid as the filename in the/spooler/print directory.

If error occurs while creating the data file for this job:
Remove the data file.
Remove the JDF file.
Return SP_SPOOLERFULL error.
The SP_SPOOLFILES and SP_SPOOLEDJOBS attributes in the spool/despool component are incremented by the value of one.
Insert the jobid of this job into the array of jobs currently being spooled.

If the files for this print job were successfully created, one embodiment of the invention also determines whether the current print job is a PDF file as seen at decision operation 564, because in one embodiment of the invention a PDF file is to be fully spooled to disk before it is despooled, which is different than non-PDF files. Therefore, in this embodiment, whether or not the file is a PDF file determines how the corresponding print job will be handled. A status field records the appropriate PDF status in this instance. If the current job is a PDF file, the status attribute is updated 566 in the job monitor table to indicate that spooling cannot despool. If not a PDF file as determined at decision operation 564, the status attribute is updated 568 to reflect a status in the job monitor that spooling can despool, and a message is sent 570 to the despooler PCM that there is a job waiting to be despooled. The file handle for the newly opened data file in the print directory will then be returned to the caller as seen at operation 572. This file handle is used to identify where to write incoming file data for subsequent write function calls (e.g., sp_write calls). One embodiment of a process for implementing the operations such as those described above is provided in the following example.

EXAMPLE #4

If current job is a PDF file
   Update status attribute in job monitor table to SPOOLING CAN'T DESPOOL
If current job is not a PDF file
   Update status attribute in job monitor table to SPOOLING CAN DESPOOL
   Send message to the despooler PCM that there is a job waiting to be despooled.
Return the pointer to p structure with the file handle to the data file in the print directory contained to the caller.

The despooler PCM, upon receiving a message stating that a job is available to despool (i.e., message sent via operation 570 of FIG. 5), will make a call to the job monitor to obtain the next print job to be despooled to the multiplexer (MUX). The despooler PCM will process this new job to the MUX component for printing. The job entry into the job monitor table holds the current number of bytes read in from the caller, and the current number of bytes despooled to the MUX component for each job that has been spooled. The despooler also monitors the array of jobs currently being spooled for this job ID. These values are used in the spooler/despooler component for any job that is being despooled while spooling. If the print job has not been sent to the despooler PCM, the current number of bytes despooled to the MUX component for each job will be zero. The despooling process is described more fully below.

Figure 6:
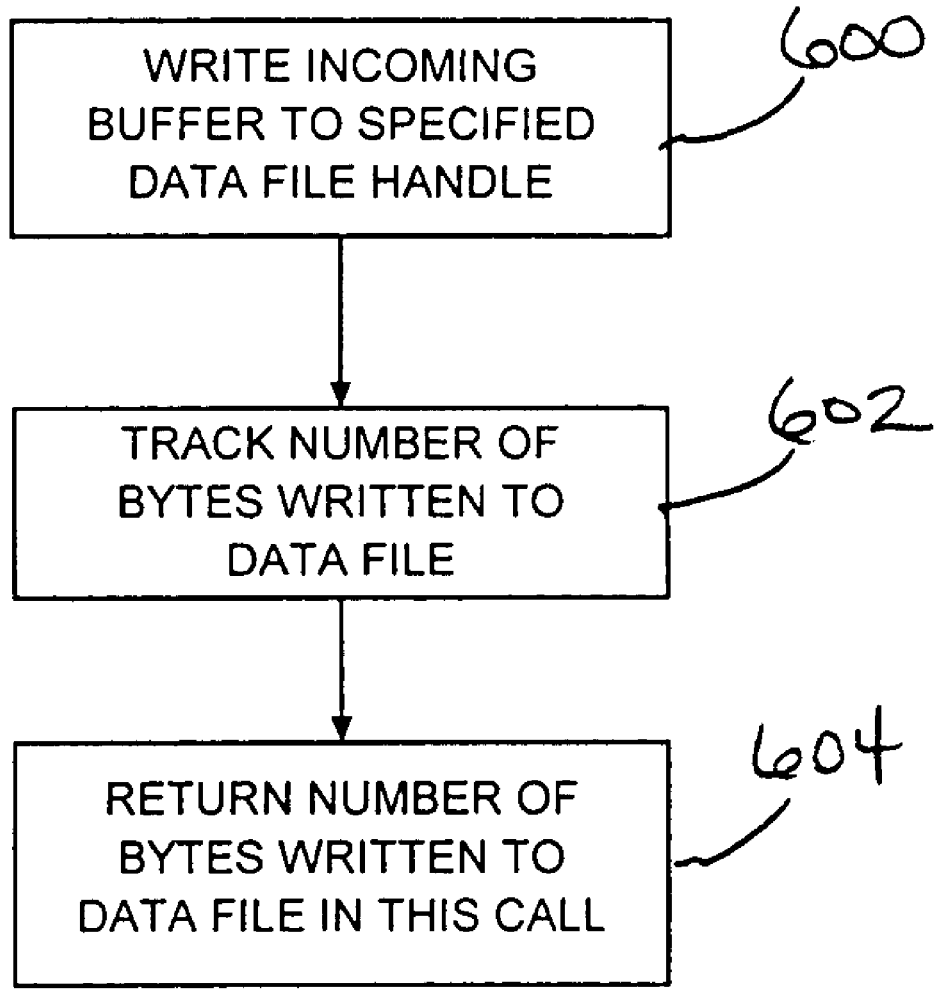
FIG. 6 is a flow diagram of a manner of writing print data to a storage medium to allow buffered data to be written to a print file.

Once the spooler setup function has been completed as described in connection with FIG. 5, data can be spooled for subsequent printing as seen in the flowchart of FIG. 6. This can be accomplished by calling a write function (e.g., sp_write). The write call allows buffered data to be written to a print file corresponding to the data file handle returned upon completion of the spooler setup function. In one embodiment, the write call includes various parameters associated with it, including the job ID, the data file handle, the particular file buffer and file buffer size. The write call writes 600 the incoming buffer to the data file handle specified as the parameter, and records the number of bytes actually written to the data file in the print directory as seen at operation 602. The number of bytes actually written out to the data file in this call are then returned 604. The returned value for the number of bytes written is added to the number of bytes written by previous writes in the job monitor table. Alternatively, the number of bytes written may be updated in the job monitor table during the write function. The return value (number of bytes written) returned to the caller will inform the caller to either abort the job or to continue sending the data from the point where the write call left off with bytes already written to the data file. Multiple write function calls may be used to write the data to the specified data file listed in the job entry in the job monitor table. One embodiment of a process for implementing the illustrated operations of FIG. 6 is provided in the following example.

EXAMPLE #5

Write incoming buffer to the file handle specified as the parameter.
Get the number of bytes actually written to the data file in the print directory—the low level write call returns the number of bytes written.
Return the number of bytes that were actually written out to the data file in this call.

The job entry in the job monitor table will be updated by the MUX component on each write call (e.g., sp_write) made to the spooler. This allows the despooler PCM to determine how much data has been written to the data file in the print directory, so that the despooler PCM can determine how much data can currently be written out to the MUX component for printing. The total number of bytes written to the data file in the print directory will be returned to the caller. The caller can then determine how many bytes were written to the data file and proceed from that byte count with a subsequent sp_write call, or alternatively can choose to abort the print job and execute a spooler close function.

When the caller has completed sending data to the specified data file in the print directory via the write function, the spooling function is closed. In one embodiment this is performed by calling a close spooling function (e.g., sp_close). In this embodiment, the close spooling call includes various parameters, including the job ID, the data file handle, and a command to indicate whether the print job is aborted or completed. The close spooling function returns a status value indicating whether the close spool function was successful. One particular embodiment of such a close spool function is illustrated in the flow diagram of FIG. 7.

Figure 7:
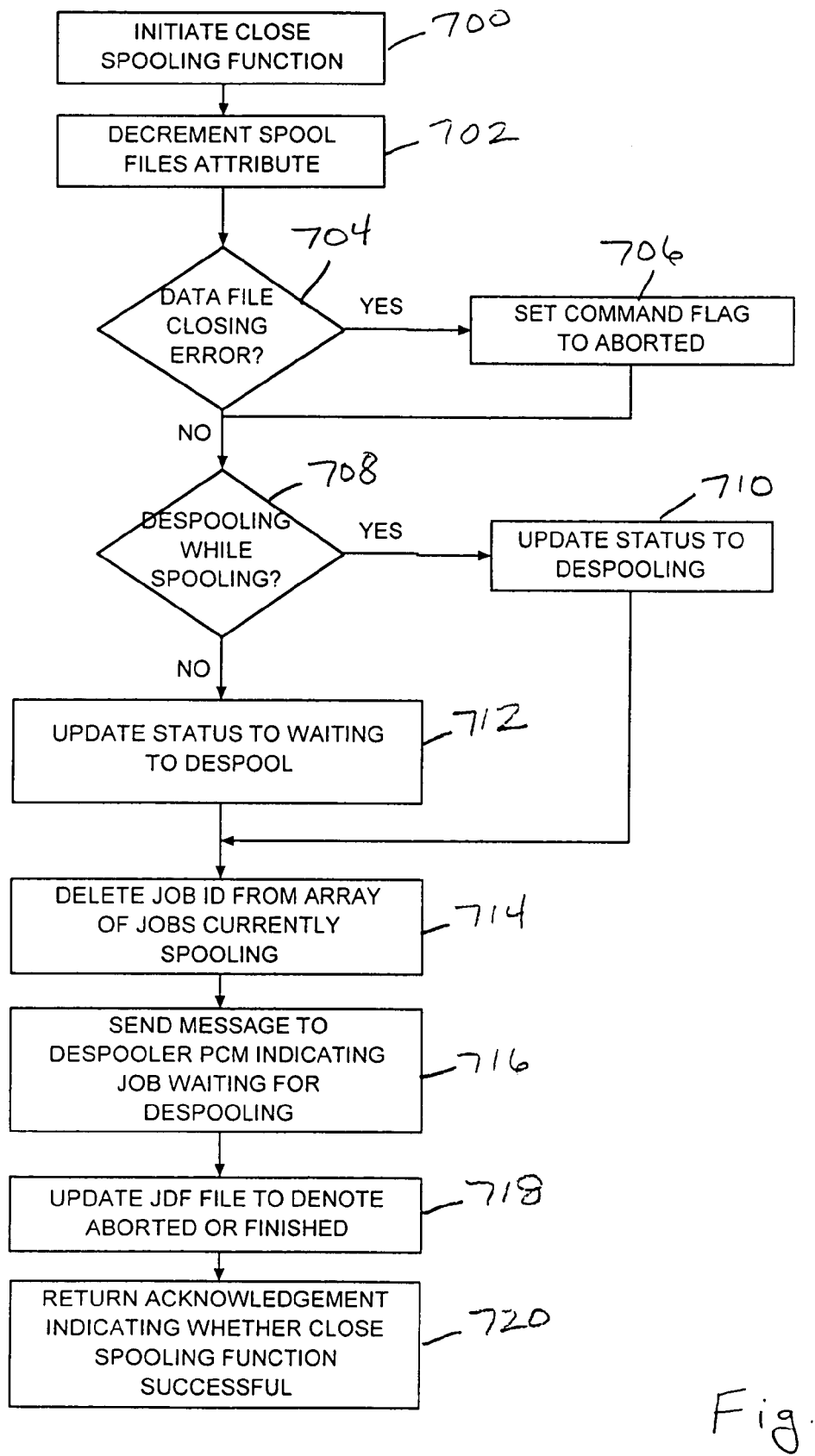
FIG. 7 is a flow diagram of a close spooling operation in accordance with one embodiment of the present invention.

When the caller has completed sending data to the specified data file in the print directory (e.g., using the sp_write function call), a close spooling function (e.g., sp_close) is initiated as seen at operation 700 of FIG. 7. The close spool function incorporates various parameters, including the jobid, data file handle and a command of ABORTED or FINISHED. The attribute SP_SPOOLFILES, which indicates the number of open file descriptors currently in the spool component, is decremented 702 by one to indicate the corresponding reduction in open file descriptors being spooled. If an error occurs on the close of the data file as determined at decision operation 704, the command flag is set to ABORTED. In either case, it is determined 708 whether this print job was despooling while spooling. If so, the status is updated 710 to indicate that it is despooling, and otherwise is updated 712 to indicate that this job is waiting to despool. The job ID is deleted 714 from the array of jobs currently spooling, and a message is sent 716 to the despooler PCM indicating that a job is waiting for despooling. An "end of job" attribute for this job into the job description file will also be updated on the sp_close function call. The "end of job" attribute will be updated 718 to a first indicator when a command of FINISHED has been passed in with sp_close denoting the data file in the print directory has successfully been written to disk. This "end of job" attribute will be updated 718 to a second indicator when a command of ABORTED has been passed in with sp_close denoting an error occurred while writing the data file in the print directory, or if an error occurs on the close of the data file located in the print directory. These JDF file updates will allow the despooler PCM to determine that the data file has been completely written to disk, or that some type of error occurred while writing the data file in the print directory. For example, if the file is a PDF file, and the value of the attribute for end of job is the second indicator, the despooler PCM can disregard the job. The close spooling function returns an indication of whether the close function was successful, such as either SP_OK or SP_CLOSEFAILED. One embodiment of a process for implementing the illustrated operations of FIG. 7 is provided in the following example.

EXAMPLE #6

Decrement SP_SPOOLFILES attribute in the spool/despool component by one.
If an error occurs on the close of the data file:
  COMMAND FLAG equals ABORTED
  If this job is spooling while despooling
    Update status attribute for job in job monitor to DESPOOLING
  Else
    Update status attribute for job in job monitor to WAITING TO DESPOOL
Else
  If this job is spooling while despooling
    Update status attribute for job in job monitor to DESPOOLING
  Else
    Update status attribute for job in job monitor to WAITING TO DESPOOL
Delete the jobid for this job from the array of jobs currently spooling.
Send a message to the despooler PCM that there is a job waiting to be despooled.
The JDF file for job updated to denote ABORTED or FINISHED command on the file. Return SP_OK or SP_CLOSEFAILED to the caller.

The spooler open function, upon success, will send a message to the despooler PCM if the incoming print job is not a PDF file. The spooler close function, upon success, will send a message to the despooler PCM that a print job has been spooled, and is ready to be despooled. The despooler PCM makes a call to the job monitor to get the next job to be despooled to the MUX with the recently received message from the sp_open or sp_close functions. The despooler PCM processes this new job to the MUX component as the new job is coming into the spooler to be printed by the printer. The despooler PCM determines how much data has been written to the data file in the print directory when the MUX, upon every successful sp_write call, updates the number of bytes received and written in the job monitor for this particular job. The despooler PCM ascertains that the new job has been completely written to the data file in the print directory when the spooling close call removes the job ID from the array of jobs currently spooling.

The despooler module handles incoming requests from the job monitor and processes these requests into tasks to be performed by the despooler PCM. These tasks may include such updating spool/despool variables for print jobs currently being processed by the despooler PCM, and updating spool/despool variables for the despooler PCM.

Figure 8A:
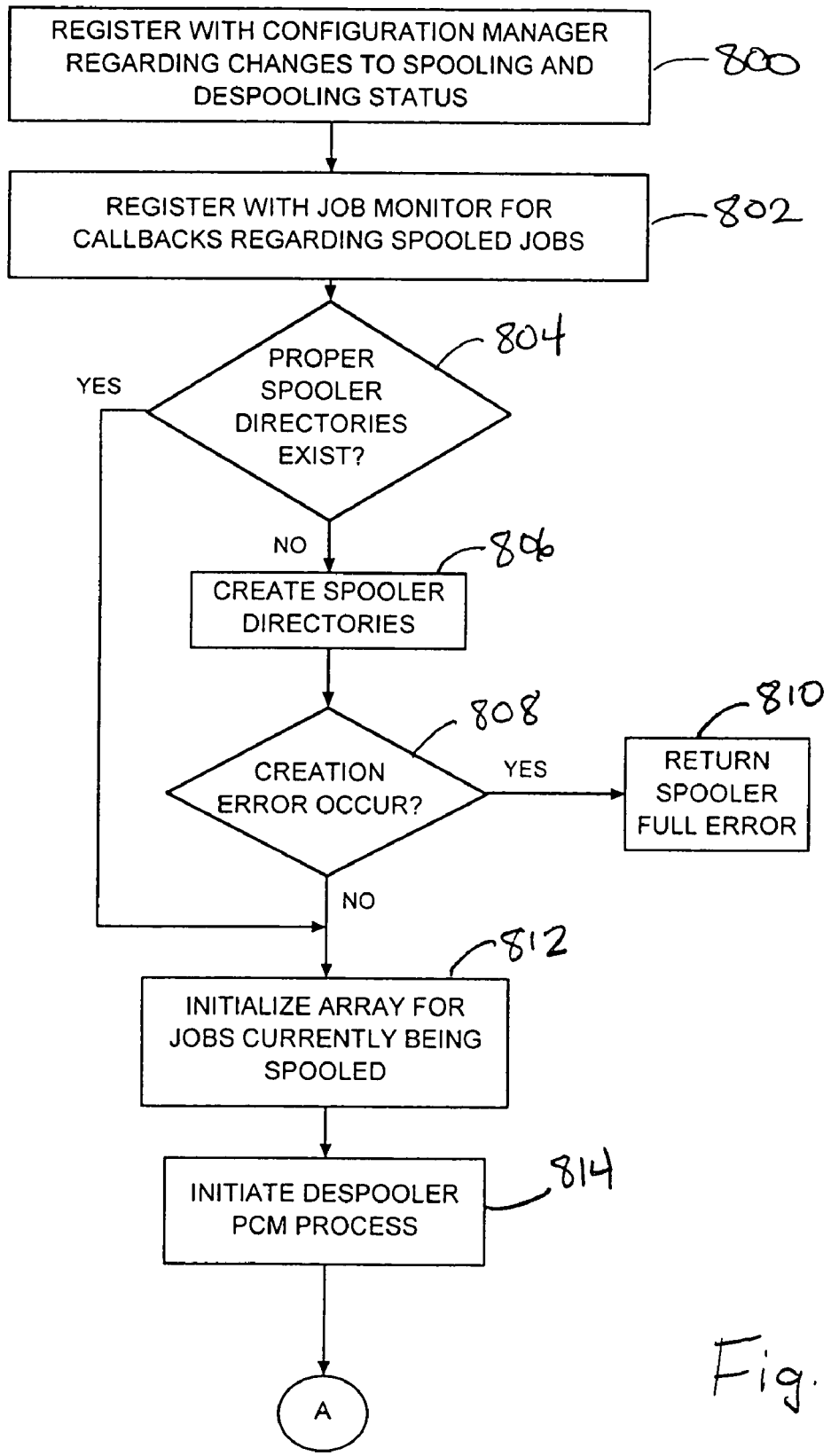
FIGS. 8A and 8B, is a flow diagram of one embodiment of a despooler process upon initialization of the printer in accordance with the principles of the present invention.
Figure 8B:
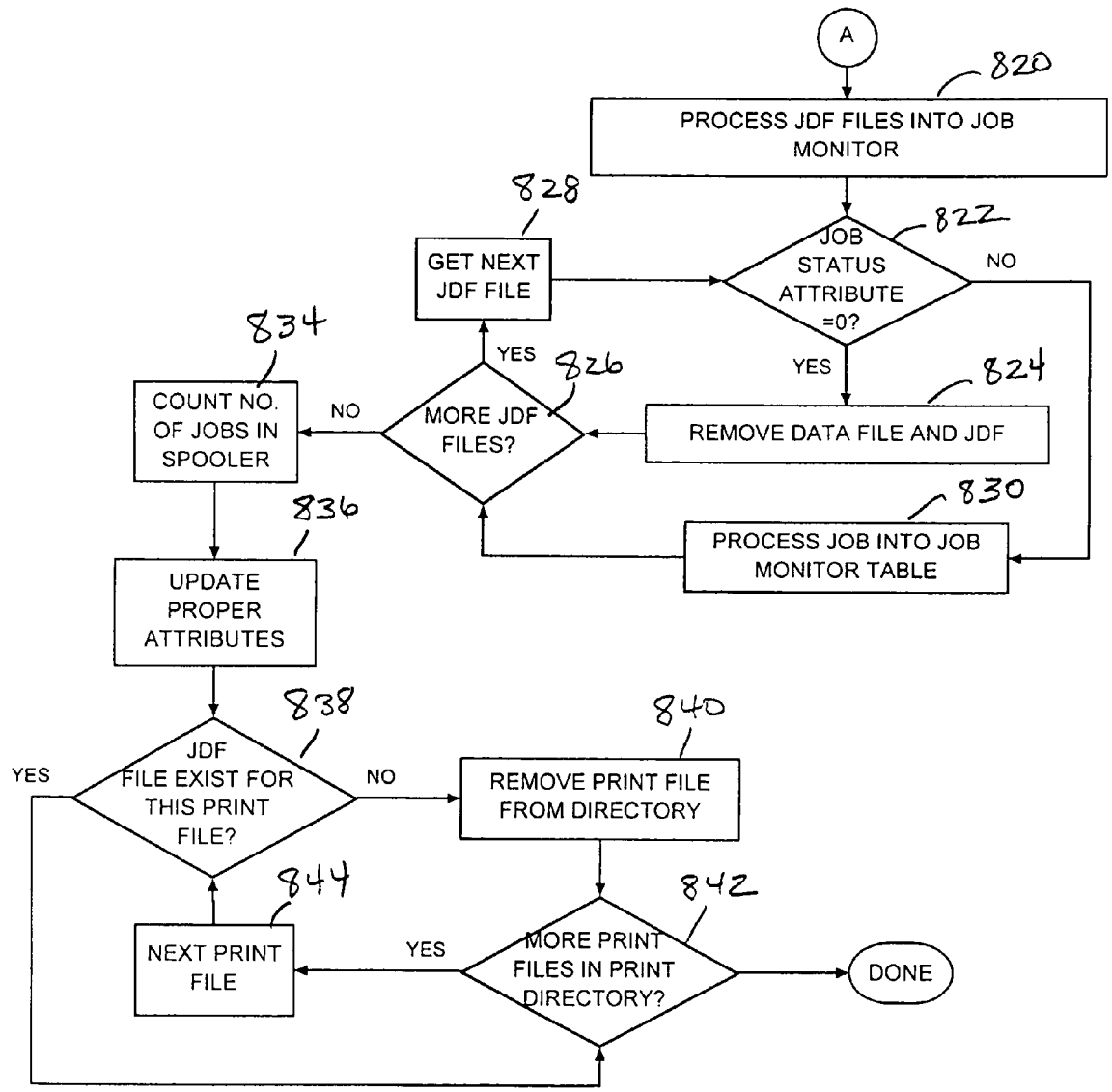

FIG. 8, including FIGS. 8A and 8B, is a flow diagram of one embodiment of a despooler process upon initialization of the printer in accordance with the principles of the present invention. In one embodiment of the invention, the despooler process comprises a daemon that is initiated upon initialization of the printer, and runs until the printer is powered off. While the despooler is initializing, the despooler will enable the despooler PCM. The despooler registers 800 with the configuration manager regarding changes to the spool and despool status, such as whether they are enabled or disabled. The despooler also registers 802 with the job monitor for any callbacks for spooled jobs in the job monitor. The process of registering with the job monitor for any callbacks on spooled jobs allows the despooler to update any information in the JDF file for the job, and to update the job currently being processed by the despooler PCM.

If the proper spooler directories do not exist as determined at decision operation 804, the despooler will create 806 all of the necessary directories, and if it is determined 808 that an error occurred during this creation, a spooler full error is returned 810. The despooler will initialize the array for the jobs currently being spooled to a predetermined number and each element in the array to zero (empty list of jobs currently being spooled), as illustrated at operation 812. The array size for the jobs currently spooling is set to the number of jobs that can be spooled, which in one embodiment is set to four as the default plus one. The despooler PCM process is initiated 814. One embodiment of a process for implementing such operations is provided in the following example.

EXAMPLE #7

Register with configuration mgr changes to SP_SPOOL status (ENABLE, DISABLE)
Register with configuration mgr changes to SP_DESPOOL status (ENABLE, DISABLE NOW, DISABLE GRACEFULLY).
Register with the job monitor for any callbacks about spooled jobs.
If the/spooler directory does not exist on the disk:
  Create the/spooler directory.
  If error occurs while creating/spooler directory:
    Return SP_SPOOLERFULL error.
If the/spooler/print directory does not exist on the disk:
  Create the/spooler/print directory.
  If error occurs while creating/spooler/print directory:
    Return SP_SPOOLERFULL error.
If the/spooler/jdf directory does not exist on the disk:
  Create the/spooler/jdf directory.
  If error occurs while creating/spooler/jdf directory:
    Return SP_SPOOLERFULL error.
Initialize array for jobs currently being spooled to predefined size (default plus 1).
Initialize each element in the array of jobs currently being spooled to zero.
Start the despooler PCM process.

The despooler will process in all the JDF files that are in the JDF directory into the job monitor as seen at operation 820. The job monitor is notified through calls to enter each of these jobs into the job monitor table. The jobs in the queue will be preserved over power cycles of the printer, provided the request to spool new jobs finished spooling prior to the power cycle of the printer. If the job was not fully written to disk prior to a power cycle (e.g., job status attribute=0 as shown at operation 822), the JDF and data file for this job will be discarded as illustrated at operation 824. Where there are more JDF files as determined at decision operation 826, the next JDF file is obtained 828, which is in turn checked to determine if it was fully written to disk prior to the power cycle. Where the job was fully written to disk prior to the power cycle as determined at operation 822, the job is processed 830 into the job monitor table, and the remaining JDF files are similarly checked. The despooler can determine if the file was completely written to disk by the "end of job" parameter in the JDF file for each job.

The despooler will count 834 the number of jobs in the spooler, and will update 836 the spooled jobs attribute (e.g., SP_SPOOLEDJOBS) with this job count in the spooler, and the spooled files attribute (e.g., SP_SPOOLFILES) with a count of zero. The despooler determines 838 whether JDF files exist for each of the print files for each of the print files in the print directory. If no JDF file exists, the print file is removed 840. In either case, it is determined 842 whether more print files are to be checked, and if so, the next print file 844 is similarly analyzed. One embodiment of a process for implementing operations such as operations 820-844 is provided in the following example.

EXAMPLE #8

Process each JDF file in JDF directory into the job monitor.
For each JDF file in the jdf directory:
  If job status attribute is equal to zero:
    Remove the data file associated with this job.
    Remove the JDF file associated with this job.
    Go to the top of the loop and get the next JDF file.
  Process this job into the job monitor table.
  Go to the top of the loop and get the next JDF file.
Count the number of jobs in the spooler.
Update the attribute of SP_SPOOLEDJOBS with the count of jobs in the spooler.
Update the attribute of SP_SPOOLFILES with the count of zero.
For each print file in the print directory:
  Make sure a JDF file for this job exists in the jdf directory.
  If no JDF file exists for this print file
    Remove this print file from the print directory.

Figure 9:
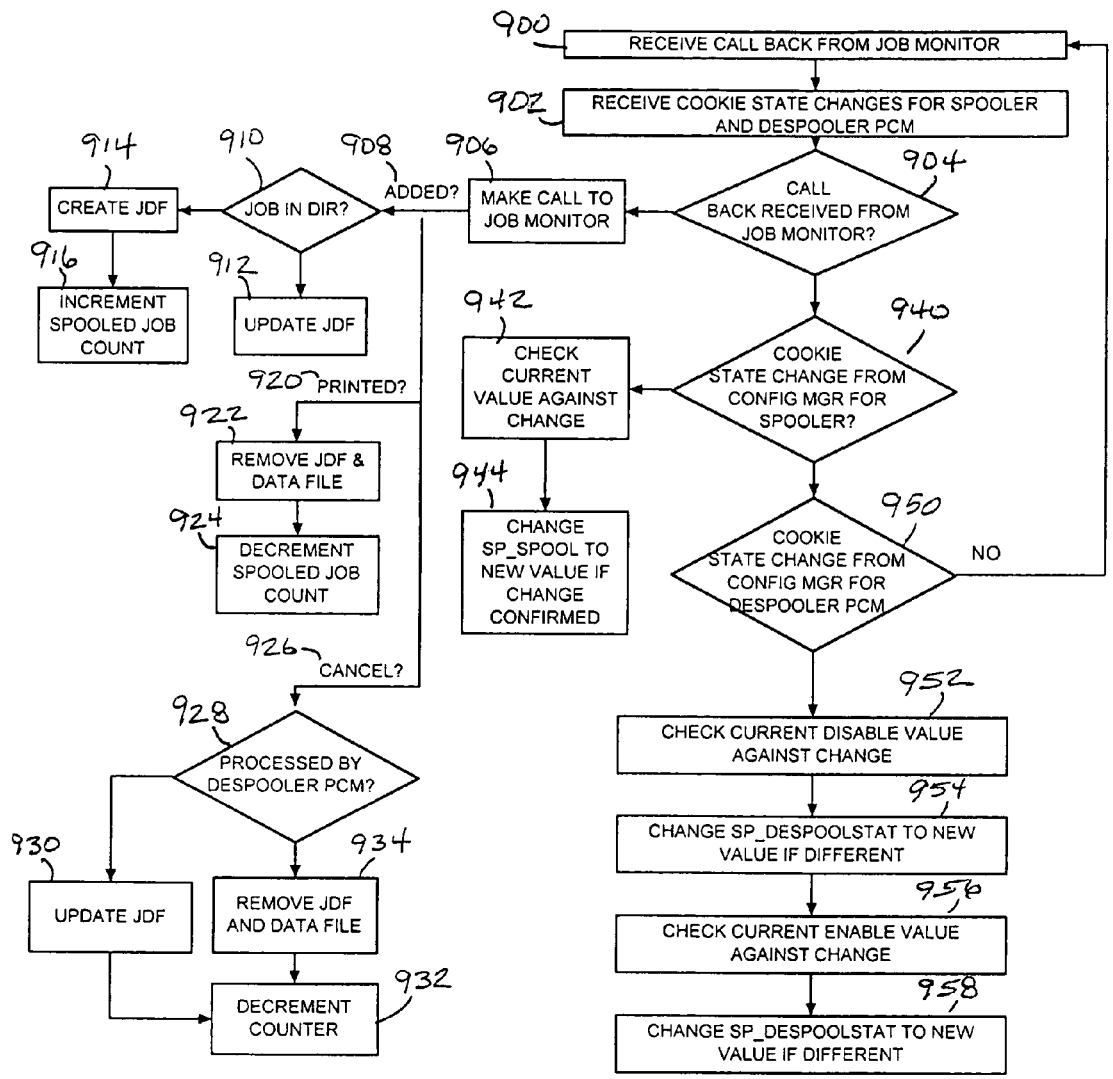
FIG. 9 is a flow diagram of one embodiment of despooler process operation during normal operation in accordance with the principles of the present invention.

FIG. 9 is a flow diagram of one embodiment of despooler process operation during normal operation in accordance with the principles of the present invention. In one embodiment of the invention, the despooler process under normal operating conditions comprises a daemon that runs until the printer is powered off.

The despooler, under normal operations, will receive and process incoming call backs from the job monitor as seen at operation 900, and will receive 902 cookie state changes from the configuration manager for the spooler and despooler PCM. Based on the call backs and cookie state changes received, the despooler will update variables used by the spooler and despooler PCM when necessary, and update JDF files for jobs in the spooler when necessary. The despooler module continually monitors for such call backs and cookie state changes.

When a call back is received from the job monitor as determined at decision operation 904, a call is made 906 to the job monitor to obtain the information related to this job in order to update its corresponding JDF parameters. If the job was added 908 to the spooler, the despooler will determine 910 whether a JDF file for this job already exists in the JDF directory. If a JDF file for this job does not exist, the despooler will create 914 a JDF file, and apply the values received from the job monitor in response to the job monitor call 906. If it is determined 910 that a JDF file for this job does exist in the jdf directory, the despooler will update the existing JDF with the values received from the job monitor in response to the job monitor call 906.

If the call back received from the job monitor as a result of call 906 indicates that a spooled job has been printed 920 (i.e., completely stacked on the printer's output bin), the despooler will remove 922 the JDF and data file for this job, and will decrement 924 the spooled job count (e.g., SP_SPOOLED-JOBS).

If the call back received from the job monitor as a result of call 906 indicates that a spooled job has been canceled 926, the despooler will determine whether the print job is currently being processed by the despooler PCM as seen at operation 928. If so, the despooler will update 930 the JDF to denote that this job has been canceled. Otherwise, the JDF and data files for this job are removed 934. Whether or not the job to be canceled is currently being processed by the despooler PCM, the spooled job count (e.g., SP_SPOOLEDJOBS) is decremented 932. One embodiment of a process for implementing operations such as operations 900-934 is provided in the following example.

EXAMPLE #9

Execute forever the following:
Receive call back routines from the job monitor.
If call back request from job monitor to add a new job:
Make a call to the job monitor to get information about this job.
If a job was added to the spooler:
  If the job does not already exist in the JDF directory:
    Create the JDF file for this job that was added
    Increment the SP_SPOOLEDJOBS counter by one.
  Else
    Update the JDF file for this added job.
If job was printed completely:
  Remove the JDF file for this job.
  Remove the data file for this job.
  Decrement the SP_SPOOLEDJOBS counter by one.
If job is to be canceled:
  If job is currently being processed by the despooler PCM:
    Update the JDF file for this job to be canceled
  Else
    Remove the JDF file for this job.
    Remove the data file for this job.
    Decrement the SP_SPOOLEDJOBS counter by one.

When a cookie state change has been received from the configuration manager for spooler (e.g., SP_SPOOL) as determined at decision operation 940, the despooler will verify whether a change actually occurred. The despooler will compare its current SP_SPOOL value with that of the incoming cookie change value as shown at operation 942. If a change is confirmed, the despooler will update the SP_SPOOL value with the new cookie state change, as illustrated at operation 944. One embodiment of a process for implementing these cookie state change operations is provided in the following example.

EXAMPLE #10

If cookie state change of SP_SPOOL occurred:
Check current value of SP_SPOOL contained in despooler.
If cookie state change is different than the current SP_SPOOL value:
Change the value of SP_SPOOL to the new value.

When a cookie state change has been received from the configuration manager for the despooler PCM (e.g., SP_DESPOOL) as determined at decision operation 950, despooler will verify whether a change actually occurred. The despooler will compare 952 its current SP_DESPOOLSTAT value with that of the incoming cookie change value SP_DESPOOL. If the value of SP_DESPOOL corresponds to "disable now" or "disable gracefully," and the value of SP_DESPOOLSTAT is "disabled," "disable now," or "disable gracefully," no changes will occur; otherwise, if the values are different, the value of SP_DESPOOLSTAT will be set to equal the value of SP_DESPOOL as generally indicated at operation 954. This will inform the despooler PCM to disable itself according to the SP_DESPOOLSTAT value.

The value of SP_DESPOOL is compared 956 to its current state SP_DESPOOLSTAT, and if the value of SP_DESPOOL is "enable" and SP_DESPOOLSTAT is "enabled" or "enable," no changes will occur; otherwise, the value of SP_DESPOOLSTAT will be set equal to the value of SP_DESPOOL as shown at operation 958. This will inform the despooler PCM to enable itself according to the SP_DESPOOLSTAT value. An embodiment of a process for implementing these cookie state change operations, such as operations 950-958, is provided in the following example:

EXAMPLE #11

If cookie state change of SP_DESPOOL occurred:
Check current value of SP_DESPOOLSTAT
If cookie state change is disable now or disable gracefully and . . . SP DESPOOLSTAT is disabled or disable now or disable gracefully:
Do nothing
Else
Set SP_DESPOOLSTAT value to the cookie state value received.
If cookie state change is enable and SP_DESPOOLSTAT is enabled or enable
Do nothing
Else
Set SP_DESPOOLSTAT value to the cookie state value received.

The despooler PCM module processes print jobs to the MUX component. It makes calls to the job monitor requesting the next spooled job to be despooled to the MUX, and processes the information received from the job monitor to allow it to send jobs to the MUX component to be printed. When necessary, it formats PDF files into postscript (PS) data before sending these jobs to the MUX component for printing. The formatting of the PDF file to PS data can be performed by commercially-available software utilities, such as provided by Adobe Systems Inc. The PDF file will be converted to postscript data while being sent to the MUX component for printing. This process saves disk space, as no converted postscript file is being written back to the hard disk.

The despooler PCM process is a daemon that is initiated upon printer initialization, and runs until the printer is powered off. The despooler process, during printer initialization, activates the despooler PCM process. In one embodiment, the despooler PCM process is always started. The process of registering and allocating with the MUX component will only be started if the configuration manager parameter for SP_DESPOOL is set to ENABLED and a hard disk exists in the printer.

The despooler PCM runs even if the configuration manager parameter for SP_DESPOOL is set to DISABLED, DISABLE NOW, or DISABLE GRACEFULLY. The piece of the despooler PCM that may or may not be running is the communication between the despooler PCM and the MUX component. The despooler PCM knows when to enable and disable the communications between the MUX component and the despooler PCM. The despooler will be registered with the configuration manager on changes that are made with the SP_DESPOOL parameter. The SP_DESPOOL parameter can be set to DISABLED, DISABLE NOW, DISABLE GRACEFULLY, ENABLED, or ENABLE. The despooler PCM performs various operations for each of these states, which is described more fully below.

The despooler PCM, under normal operations, will react to changes in variables made by the despooler task, and will update those variables when the despooler PCM is done processing the changes. The despooler PCM makes a call to the job monitor to identify jobs to be processed for printing. The despooler PCM also formats PDF files into postscript data, and sends files/data to be printed to the MUX component.

Figure 10:
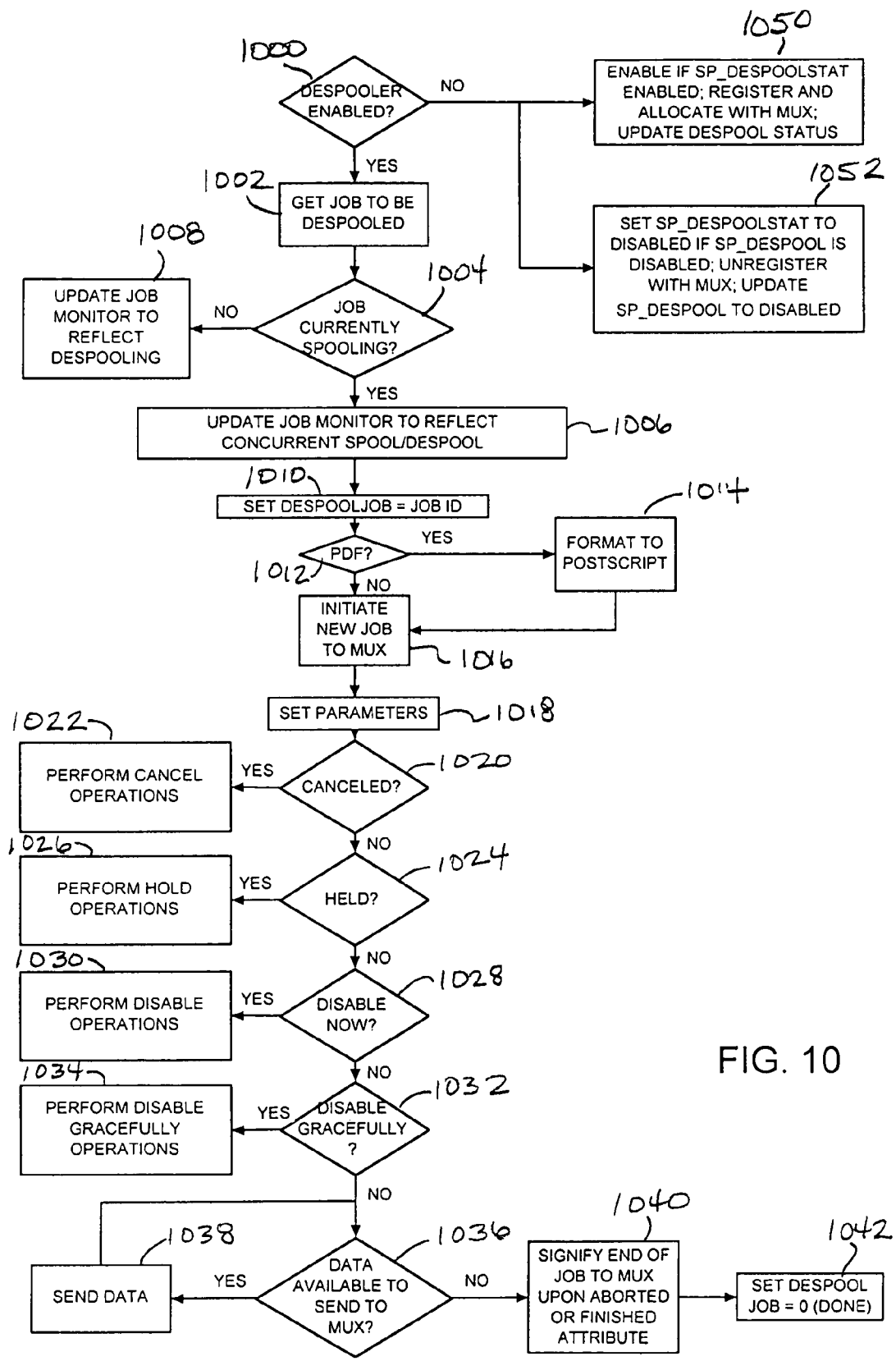
FIG. 10 is a flow diagram illustrating one embodiment of a process for despooling a print job concurrently with the spooling of the print job in accordance with the present invention.

FIG. 10 is a flow diagram illustrating one embodiment of a process for despooling a print job concurrently with spooling of the print job in accordance with the present invention. In one embodiment, the process continually runs, in order to monitor the requisite events to perform its desired functionality. If the despooler is enabled as determined at decision operation 1000, the next job to be despooled is obtained from the job monitor as seen as operation 1002. The job will be obtained upon receipt of a triggering message, denoting a new file to print has arrived in the spool/despool component, wherein the despooler PCM makes a call to the job monitor to get the next job to despool to the MUX. A call is made to the job monitor to update the status field for this job, where the status update depends on whether the print job is currently spooling as determined at decision operation 1004. If this job is currently spooling, the status for this job in the job monitor is updated 1006 to indicate that this job will concurrently despool while spooling (e.g., SPOOLING/DESPOOLING). If this job is not currently spooling, the status for this job in the job monitor is updated 1008 to DESPOOLING.

Other variables are updated as well, such as updating 1010 the SP_DESPOOLJOB variable with the job ID received from the job monitor, denoting that this job ID is the job to next be despooled by the despooler PCM. If the new job is a PDF file as shown at operation 1012, it is formatted 1014 to postscript, and the new job can be initiated 1016 to the MUX. Parameters relating to the job are set 1018. An embodiment of a process for implementing these operations, such as operations 1000-1018, is provided in the following example:

EXAMPLE #12

While forever:
If SP_DESPOOL is ENABLED
Job aborted flag is set to zero.
Get next job to be despooled from the job monitor
If a job is received from the job monitor:
If job is currently spooling:
Call to job monitor to update status to SPOOLING/DESPOOLING.
Else
Call to job monitor to update status to DESPOOLING.
Set SP_DESPOOLJOB equal to jobid currently despooling
If new job is a PDF file:
Format PDF file into a postscript data.
Start the new job to the MUX
Set parameters about the job in the MUX.

As described more fully below, when the file has finished going to the MUX component, the despooler PCM will make a call to the job monitor to alter the status of this job that was just despooled to DONE, and the SP_DESPOOLJOB variable will be updated to zero to indicate that no jobs are currently being processed by the despooler PCM. In one embodiment, the despooler PCM will always make a call to the job monitor requesting the next job to be despooled to the MUX component after every job the despooler PCM has despooled to the MUX component.

If status indicates that the current job should be canceled 1020, various cancel operations 1022 are performed. For example, if the job is canceled, the write function currently processing from the despooler PCM to the MUX component will be allowed to finish, the job is flushed, the job status is changed to reflect that processing is done, the JDF and data file is removed, the job aborted flag is set, and a call is made to the job monitor to change status of this job to CANCELED from SPOOLING/DESPOOLING. Similarly, if the job is held 1024, various hold operations are performed 1026. In one embodiment, these operations are similar to those performed for a cancel operation, except a call is made to the job monitor to change status of this job to HOLD from SPOOLING/DESPOOLING. An embodiment of a process for implementing these cancel/hold operations is provided in the following example:

EXAMPLE #13

Do until all the data has been sent to the MUX and an end of job attribute or aborted or finished is received or job aborted flag is set to one:
If status indicates cancel this current job:
Use apsPDIFlush to flush the job.
Use apsPDIEndOfJob to denote the job is done.
Remove the JDF file for this job.
Remove the data file for this job.
Call job monitor to change status to CANCELED
Job aborted flag is set to one.
If status indicates hold this current job:
Use apsPDIFlush to flush the job.
Use apsPDIEndOfJob to denote the job is done.
Call job monitor to change status to HELD
Job aborted flag is set to one.

When the configuration manager notifies the despooler that a state change has occurred with the SP_DESPOOL parameter, the despooler updates the SP_DESPOOLSTAT variable accordingly. If the state change is DISABLE NOW as determined at decision operation 1028, various disable operations are performed 1030. The despooler PCM will wait for the current write to the MUX to complete. Once the write to the MUX component has finished, calls will be sent to the MUX component to flush the job, to denote the job as being complete, to unregister with the MUX component to set SP_DESPOOLSTAT to "disabled," and to update the SP_DESPOOL variable to "disabled." Once the job has finished processing, the despooler PCM will make a call to the job monitor to alter the status of this job to WAITING TO DESPOOL. The despooler PCM will also update the SP_DESPOOLJOB variable to zero, indicating that no job is currently being processed by the despooler PCM.

If the state change is DISABLE GRACEFULLY as determined at decision operation 1032, various disable operations are performed 1034. The despooler PCM will wait for the current job being processed by the despooler PCM to finish, and when finished processing, the despooler PCM will make a call to the job monitor to alter the status of this job to DONE. The despooler PCM will also make a call to the configuration manager to update SP_DESPOOL to DISABLED. The despooler PCM will also update the SP_DESPOOLJOB variable to zero, denoting no job is currently being processed by the despooler PCM, and the SP_DESPOOLSTAT variable to disabled, denoting the despooler PCM is now disabled. The despooler PCM will then unregister the despooler PCM with the MUX component. An embodiment of a process for implementing these disable operations is provided in the following example:

EXAMPLE #14

If SP_DESPOOLSTAT is disable now:
Use apsPDIFlush to flush the job.
Use apsPDIEndOfJob to denote the job is done.
Use apsPDIUnregister to unregister with the MUX component.
Set SP_DESPOOLSTAT equal to disabled.
Make a call to the configuration manager to update SP_DESPOOL to disabled.
If job is currently spooling
Call to job monitor to update the status to SPOOLING CAN DESPOOL.
Else
Call to job monitor to update the status to WAITING TO DESPOOL.
Job aborted flag is set to one.
If SP_DESPOOLSTAT is disable gracefully:
Make a call to the configuration manager to update SP_DESPOOL to disable gracefully.

In one embodiment of the invention, it is also determined 1036 whether there is data available to send to the MUX, in the case of despooling while spooling new jobs. A call is made to send 1038 the data file to the MUX, and as many calls as needed may be executed. If all of the bytes have been written (i.e., no more data available to send to the MUX), and the end of job attribute is "aborted" or "finished," a call is made to change the status to DONE, and to signify the end of job to the MUX as shown at operation 1040. The SP_DESPOOLJOB variable is set to zero to indicate that no job is currently being processed by the despooler PCM, as shown at operation 1042. An embodiment of a process for implementing these operations is provided in the following example:

EXAMPLE #15

If data is available to send to the MUX
Use apsPDIData to send data file to the MUX
Else:
If all the bytes have been written and end of job attribute is aborted or finished:
Use apsPDIEndOfJob to signify end of job to MUX.
Make a call to job monitor to change status of this job to DONE.
Set SP_DESPOOLJOB equal to zero.

If the despooler status is not enabled as determined at decision operation 1000, and if the state change with the SP_DESPOOL parameter is ENABLE, the despooler PCM will perform various operations 1050, such as register with the MUX component and then allocate with the MUX component. A call is made to the configuration manager to update the SP_DESPOOL variable to ENABLED. The SP_DESPOOLSTAT variable in the spool/despool component is updated to ENABLED, and a call is made to the job monitor to get the next job to be despooled to the MUX component.

If the despooler status is not enabled as determined at decision operation 1000, and if the state change with the SP_DESPOOL parameter is DISABLE NOW or DISABLE GRACEFULLY, the despooler PCM will perform various operations 1052, such as unregistering with the MUX component, setting SP_DESPOOLSTAT equal to disabled, and making a call to the configuration manager to update SP_DESPOOL to disabled. An embodiment of a process for implementing these operations is provided in the following example:

EXAMPLE #16

If SP_DESPOOL is DISABLED:
If SP_DESPOOLSTAT is enable:
  Register with the MUX component
  Allocate with the MUX component
  Set SP_DESPOOLSTAT equal to enabled.
  Call to the configuration manager to update SP_DESPOOL to enabled.
If SP_DESPOOL is DISABLE NOW or DISABLE GRACEFULLY:
  Use apsPDIUnregister to unregister with the MUX component.
  Set SP_DESPOOLSTAT equal to disabled.
  Call to the configuration manager to update SP_DESPOOL to disabled.
If SP_DESPOOL is ENABLE:
  Register with the MUX component
  Allocate with the MUX component
  Set SP_DESPOOLSTAT equal to enabled.
  Call to the configuration manager to update SP_DESPOOL to enabled.
Go back up to the MAIN WHILE loop.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device. Such article of manufacture includes, but is not limited to, hard disks, floppy disks, CD-ROMs, tape, firmware components, and the like.

One skilled in the art of computer science will be able to combine the software created as described with appropriate general purpose or special purpose computer hardware to create a computer system and/or computer subcomponents embodying the invention, and to create a computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for increasing print job throughput in printer spooling arrangements, comprising:
  receiving a print job having associated print data;
  writing print data associated with the print job to a storage device;
  monitoring the storage device to determine when print data associated with the print job becomes available on the storage device;
  reading the print data associated with the print job from the storage device upon determining at least a portion of print data associated with the print job on the storage device is available for printing, while concurrently writing print data associated with the print job to the storage device;
  suspending reading print data associated with the print job from the storage device upon detecting a predetermined condition associated with print data associated with the print job;
and
  printing the print data associated with the print job that is read from the storage device concurrently while print data associated with the print job is being written to the storage device.

2. The method of claim 1, further comprising generating a message indicating that the print job is pending.

3. The method of claim 2, further comprising initiating the reading of the print data from the storage device in response to recognition of the message.

4. The method of claim 1, further comprising:
  maintaining status attributes to identify a data file for the print job that has been created on the storage device to spool the print data, and to identify when at least a portion of the print data associated with the print job becomes available on the storage device.

5. The method of claim 1, wherein the suspending reading of the print data associated with the print job further comprising suspending reading of the print data associated with the print job if the quantity of the print data written to the storage device is less than a predetermined number of bytes.

6. The method of claim 1, wherein the suspending reading of the print data associated with the print job further comprising suspending reading of the print data associated with the print job when all of the print data written to the storage device has been read from the storage device but before the print data has been written to the storage device in its entirety.

7. The method of claim 6, further comprising generating an end of job indication when the print data has been written to the storage device in its entirety.

8. The method of claim 6, further comprising resuming reading of the print data when additional print data has been written to the storage device.

9. The method of claim 1, further comprising reading the print data for printing from the storage device only after the writing of the print data has completed, if the print data is associated with predetermined one or more file types.

10. The method of claim 9, wherein the predetermined file types includes a PDF file type.

11. The method of claim 1, further comprising reading a number of bytes of the print data from the storage device that is above a number of bytes of the print data that has been written to the storage device.

12. The method of claim 1, further comprising updating despool availability status to identify the print data as available for reading for printing from the storage device upon creation of a data file on the storage device to which the print data is directed.

13. The method of claim 12, wherein the monitoring further comprises monitoring the despool availability status to determine when to initiate the reading of the print data from the storage device.

14. The method of claim 13, wherein monitoring the despool availability status comprises monitoring the despool availability status using a back-end despooling daemon.

15. The method of claim 12, wherein updating the despool availability status comprises updating the despool availability status using a front-end spooling daemon.

16. A printing device for processing print job requests, comprising:
   at least one input channel to receive the print job requests;
   a storage medium to store print data associated with the print job requests;
   a spooling module coupled to receive the print job requests and associated print data, and to write print data associated with a print job request to the storage medium;
   a despooling module for monitoring the storage device to determine when print data associated with the print job becomes available on the storage device and for receiving notification of an availability of the print data associated with a print job request on the storage medium, and to read print data associated with the print job from the storage device upon determining at least a portion of print data associated with the print job on the storage device is available for printing, while concurrently writing print data associated with the print job to the storage device, the despooling module further suspending reading print data associated with the print job from the storage device upon detecting a predetermined condition associated with print data associated with the print job; and
   a print engine to print the print data associated with a print job request that is read from the storage medium concurrently while print data associated with the print job is being written to the storage device.

17. The printing device of claim 16, further comprising a job monitor module to maintain spooling status including an active spool indication to indicate that the print data is being written to the storage medium.

18. The printing device of claim 16, further comprising a job monitor module to maintain spooling status including a write count indication to indicate a number of bytes of the print data that has been written to the storage medium.

19. The printing device of claim 16, wherein the despooling module comprises means for reading the first portion of the print data that does not exceed the write count indication.

20. The printing device of claim 16, wherein the storage medium is a hard disk.

21. The printing device of claim 20, wherein the hard disk is formatted with a spooler directory to reserve storage for the print data associated with the print job requests.

22. The printing device of claim 20, wherein the hard disk is resident on the printing device.

23. A print server system for processing print jobs, comprising:
   one or more client systems arranged in a network to generate print jobs identifying print data for printing;
   transmission media coupled to receive the print jobs and to transfer the print jobs initiated on the network;
   a printing device coupled to the network via the transmission media to receive and process the print jobs, the printing device comprising:
      a storage medium to store print data associated with the print jobs;
      a spooling module coupled to receive the print job requests and associated print data, and to write print data associated with a print job request to the storage medium;
      a despooling module for monitoring the storage device to determine when print data associated with the print job becomes available on the storage device and for receiving notification of an availability of the print data associated with a print job request on the storage medium, and to read print data associated with the print job from the storage device upon determining at least a portion of print data associated with the print job on the storage device is available for printing, while concurrently writing print data associated with the print job to the storage device, the despooling module further suspending reading print data associated with the print job from the storage device upon detecting a predetermined condition associated with print data associated with the print job; and
      a print engine to print the print data associated with a print job request that is read from the storage medium concurrently while print data associated with the print job is being written to the storage device.

24. The print server system of claim 23, wherein the printing device comprises at least one input channel to receive the print job requests.

25. The print server system of claim 23, wherein the printing device further comprises a job monitor module to maintain spooling status including an active spool indication to indicate that the print data is being written to the storage medium.

26. The print server system of claim 23, wherein the printing device further comprises a job monitor module to maintain spooling status including a write count indication to indicate a number of bytes of the print data that has been written to the storage medium.

27. The print server system of claim 23, wherein the despooling module comprises means for reading the first portion of the print data that does not exceed the write count indication.

28. A computer-readable program storage medium tangibly embodying a program of instructions executable by a printer system to process print jobs by performing steps comprising:
   receiving a print job having associated print data;
   writing print data associated with the print job to a storage device;
   monitoring the storage device to determine when print data associated with the print job becomes available on the storage device;
   reading print data associated with the print job from the storage device upon determining at least a portion of print data associated with the print job on the storage device is available for printing, while concurrently writing print data associated with the print job to the storage device;

suspending reading print data associated with the print job from the storage device upon detecting a predetermined condition associated with print data associated with the print job; and printing the print data associated with the print job that is read from the storage device concurrently while print data associated with the print job is being written to the storage device.

29. A method for concurrently spooling and despooling a print job to and from a storage device to increase printer throughput, comprising:

creating a file on a storage device in which to store the print job;

writing print data associated with the print job to the storage device;

maintaining a status indicator on a panel indicating whether the print data is currently being written to the storage device;

monitoring the status indicator to determine if the print job is currently being written to the storage medium;

reading print data associated with the print job from the storage device upon determining at least a portion of print data associated with the print job on the storage device is available for printing, while concurrently writing print data associated with the print job to the storage device;

suspending reading print data associated with the print job from the storage device upon detecting a predetermined condition associated with print data associated with the print job; and sending to the printing device for printing the print data associated with the print job that is read concurrently while print data associated with the print job is being written to the storage medium.

* * * * *